INVENTOR.
JACOB RUSH SNYDER

INVENTOR.
JACOB RUSH SNYDER

Jan. 10, 1956  J. R. SNYDER  2,730,409
AIR BRAKE CONTROL VALVE MECHANISM
Original Filed June 9, 1949  9 Sheets-Sheet 5

INVENTOR.
JACOB RUSH SNYDER
BY Hudson, Boughton,
Williams, David & Hoffmann
ATTORNEYS Jan. 10, 1956  J. R. SNYDER  2,730,409
AIR BRAKE CONTROL VALVE MECHANISM
Original Filed June 9, 1949  9 Sheets-Sheet 6

INVENTOR.
JACOB RUSH SNYDER
BY Hudson Boughton
Williams, David & Hoffmann
ATTORNEYS

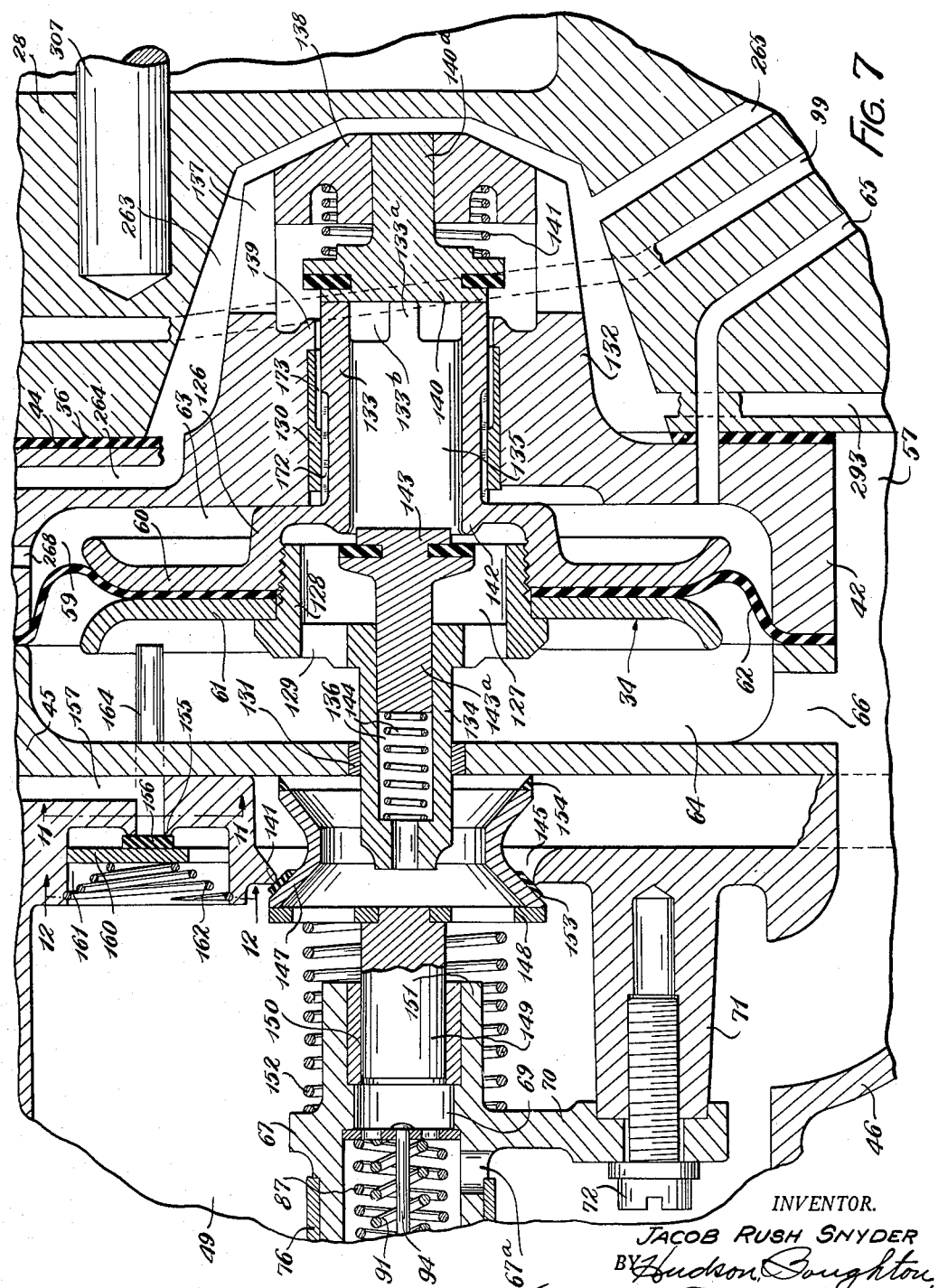

Jan. 10, 1956  J. R. SNYDER  2,730,409
AIR BRAKE CONTROL VALVE MECHANISM
Original Filed June 9, 1949  9 Sheets-Sheet 8

INVENTOR.
JACOB RUSH SNYDER
BY Hudson, Boughton,
Williams, David & Hoffmann
ATTORNEYS Jan. 10, 1956    J. R. SNYDER    2,730,409
AIR BRAKE CONTROL VALVE MECHANISM
Original Filed June 9, 1949    9 Sheets-Sheet 9
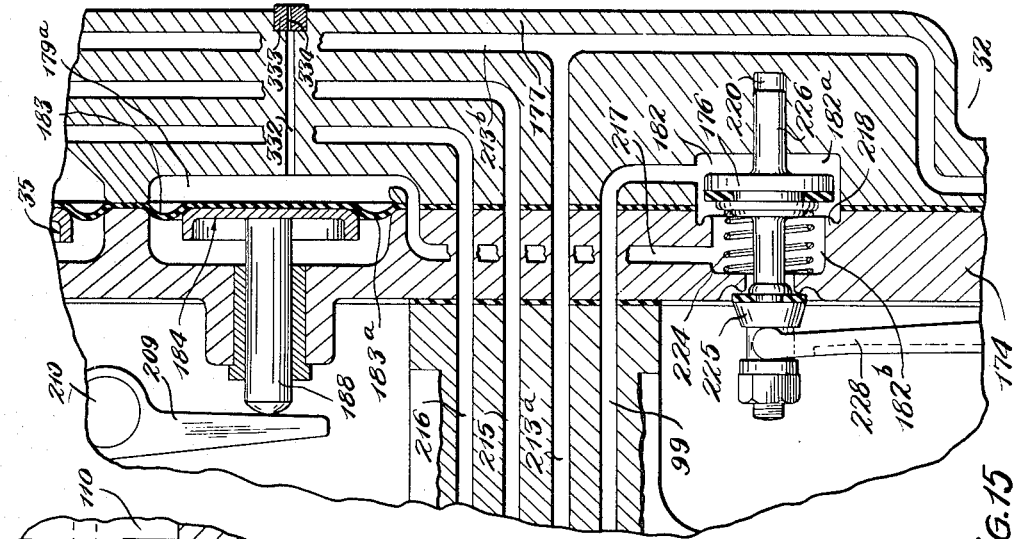
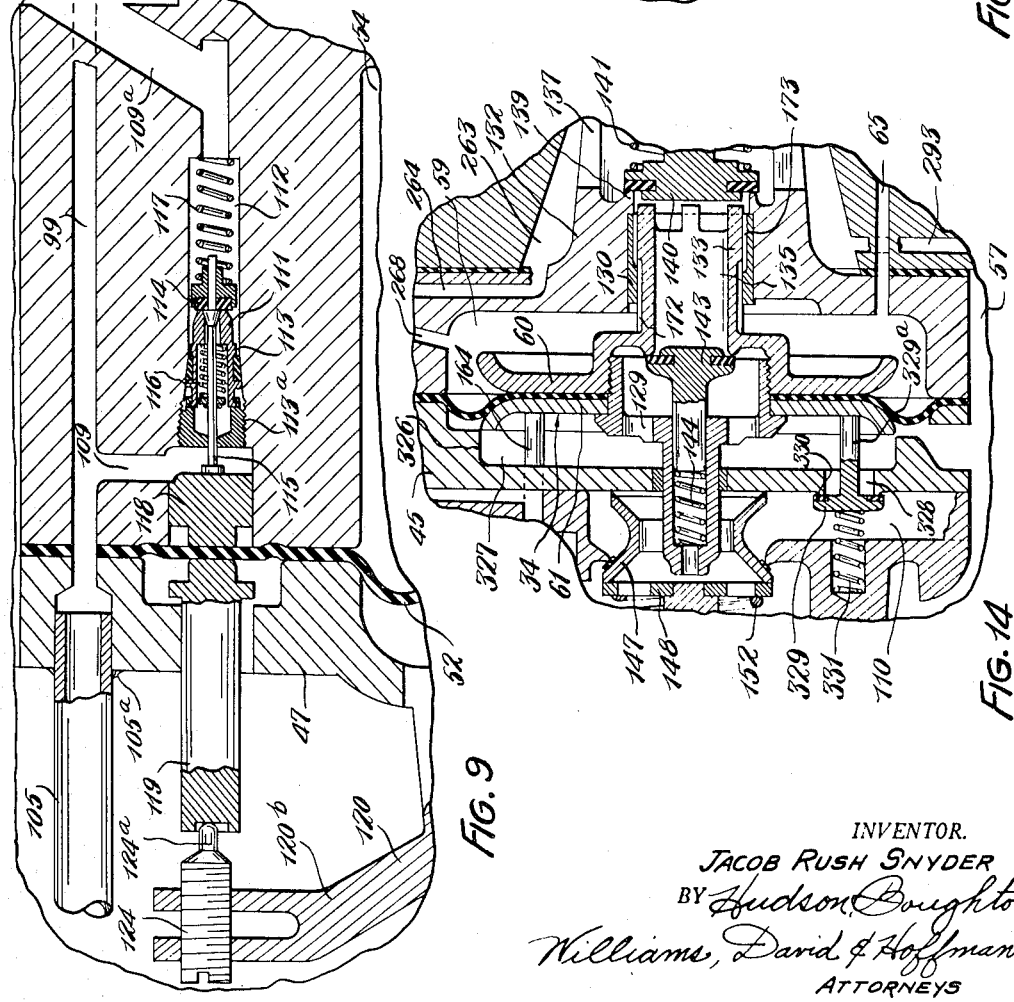
INVENTOR.
JACOB RUSH SNYDER
BY Hudson, Boughton,
Williams, David & Hoffmann
ATTORNEYS

United States Patent Office 2,730,409
Patented Jan. 10, 1956

2,730,409

AIR BRAKE CONTROL VALVE MECHANISM

Jacob Rush Snyder, Cleveland, Ohio

Application March 4, 1952, Serial No. 274,777

13 Claims. (Cl. 303—68)

This invention relates to fluid pressure brakes and, more particularly, to improved air brake apparatus for use on railway freight cars or other vehicles.

This application is a division of original application Serial No. 98,063, filed June 9, 1949.

An object of the present invention is to provide an improved air brake control valve mechanism which will function in an efficient and reliable manner under all operating conditions and which is of a relatively simple construction as compared with certain other control valve mechanisms provided heretofore.

Another object of this invention is to provide an improved air brake control valve mechanism embodying an application chamber and a relay valve means responsive to application chamber pressure for controlling the supply of pressure fluid to the brake cylinder, and in which manually operable vent means is effective on such relay valve means and/or application chamber for causing the release of brake cylinder pressure substantially without loss of pressure fluid from the reservoir which supplies the brake cylinder pressure.

Still another object is to provide improved air brake control mechanism of this character in which the manually operable vent means includes a normally closed valve adapted to be opened for venting a piston chamber of the relay valve means and a normally open valve adapted to be closed for preventing the loss of reservoir pressure.

Additionally, this invention provides an improved air brake control valve mechanism of the character above indicated in which the manually operable vent means is movable to one position for venting the relay valve piston chamber and is further operable to a second position for venting the reservoir.

It is a further object of this invention to provide novel valve means for relieving the emergency piston of fluid pressure on the brake pipe side thereof to increase the effectiveness of the emergency piston in opening the emergency vent valve.

The invention can be further briefly summarized as consisting in certain novel combinations and arrangements of parts hereinafter described in greater detail and particularly set out in the claims hereof.

In the accompanying sheets of drawings,

Fig. 7 is a larger scale fragmentary longitudinal section showing the emergency piston and the mechanism adjacent thereto;

Fig. 9 is a larger scale fragmentary longitudinal section taken through the application chamber vent valve;

Figure 3:
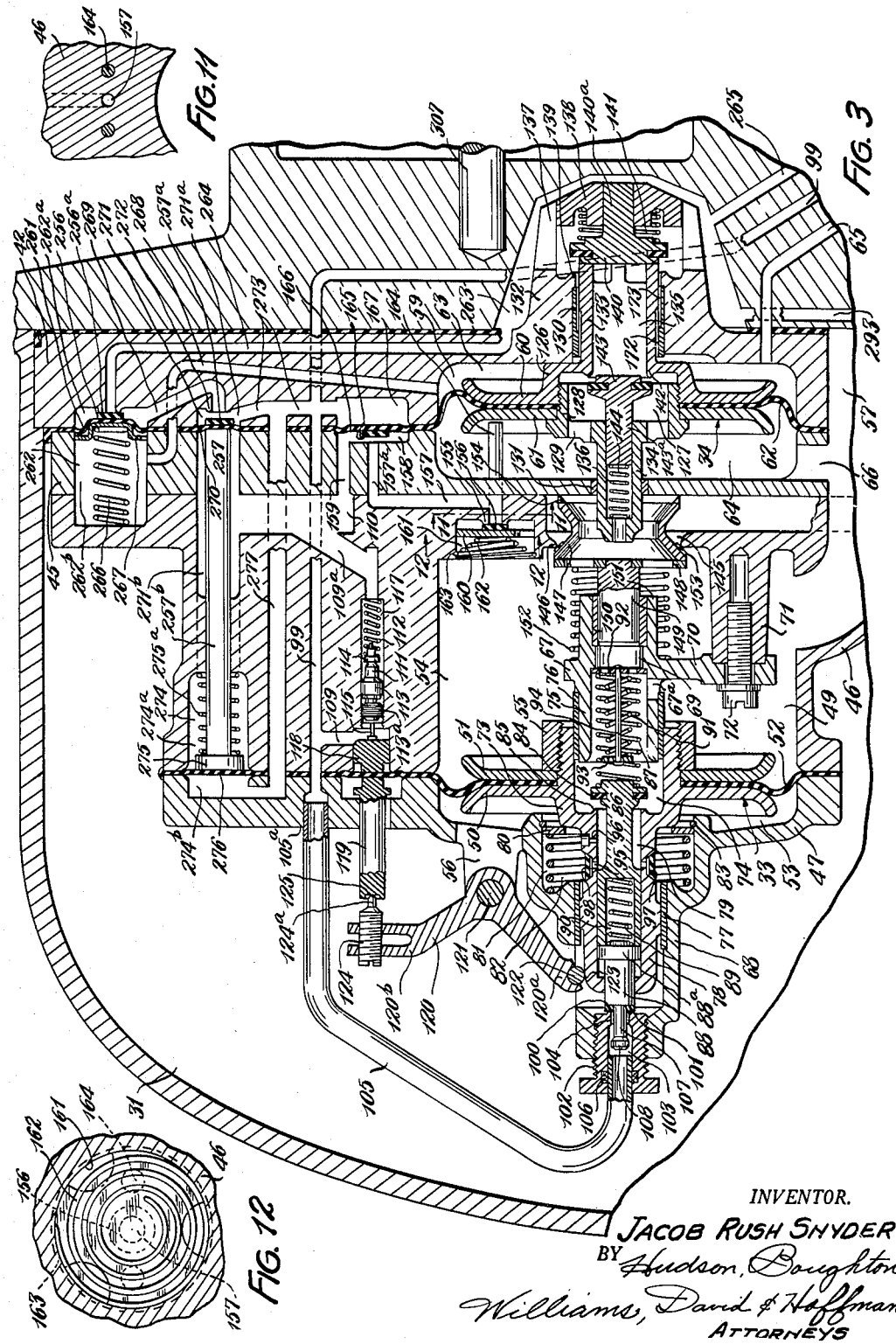
Fig. 3 is a fragmentary view of the mechanism corresponding with the portion of Fig. 2 in which the service and emergency pistons are located but showing this portion of the mechanism on a larger scale.
Figure 13:
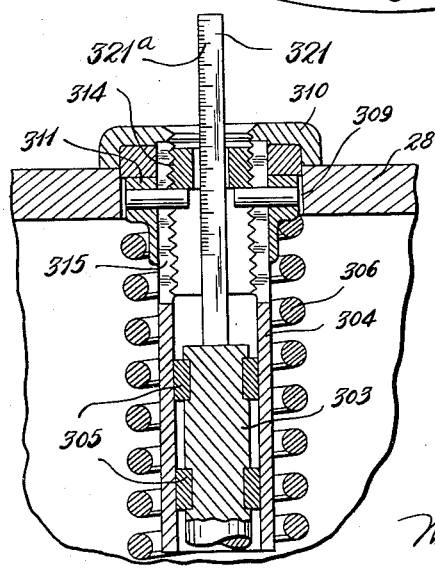

Figs. 11 and 12 are fragmentary sectional views taken respectively on section lines 11—11 and 12—12 of Figs. 3 and 7 and further illustrating the quick-service venting means;

Fig. 13 is a fragmentary vertical section showing a gauge means being used to determine the setting of the load responsive mechanism;

Fig. 14 is a larger scale fragmentary longitudinal section taken through the emergency piston and the mechanism adjacent thereto and showing a modified construction; and Fig. 15 is a larger scale fragmentary longitudinal section of the portion of the mechanism in which the relay valve mechanism is located and showing a modified construction.

General arrangement

Figure 1:
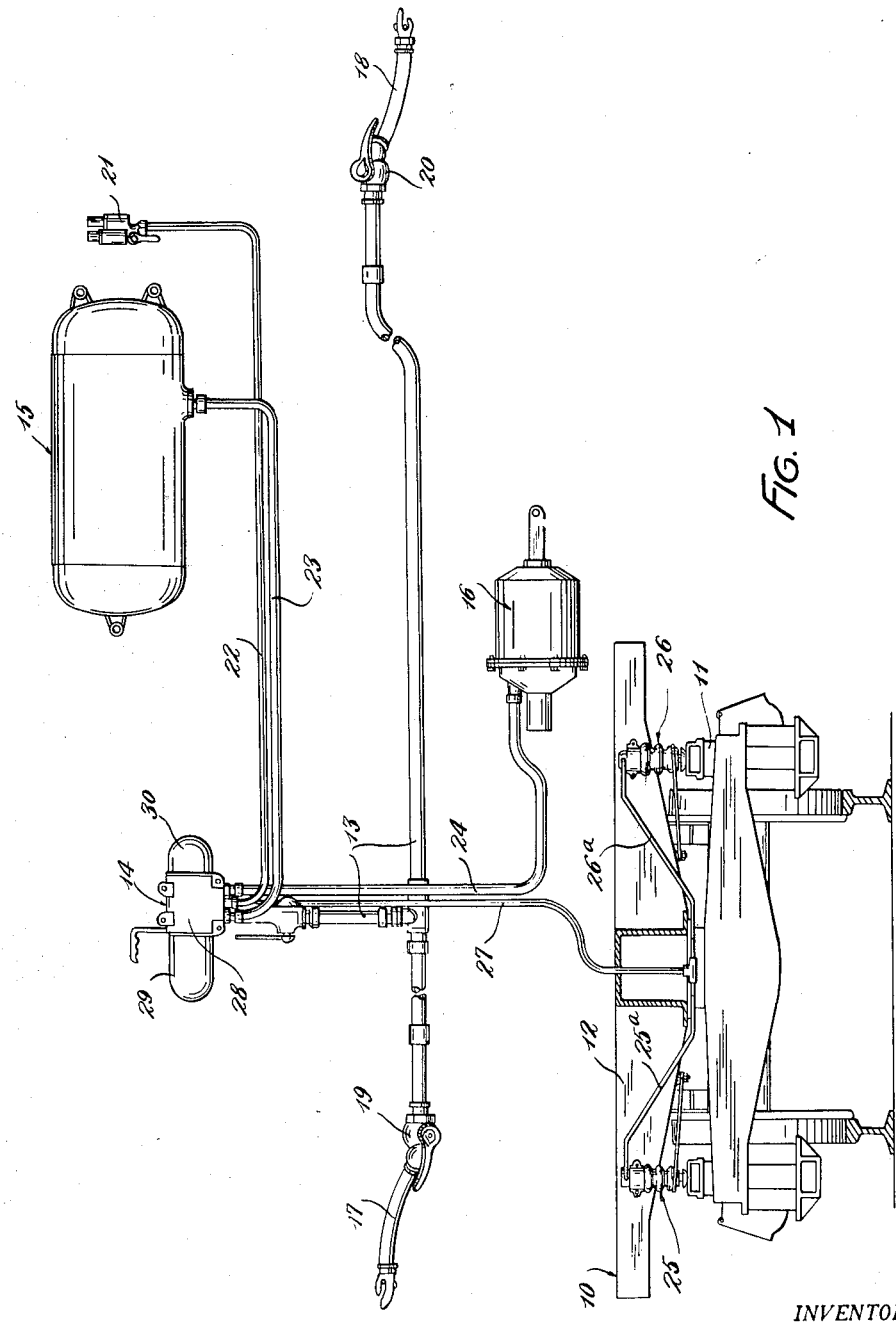
Fig. 1 is a diagrammatic view showing the improved air brake apparatus applied to a freight car and embodying hydraulic pressure means for rendering the control valve mechanism automatically responsive to changes in the load of the car.

In the diagrammatic illustration of Fig. 1, the improved air brake apparatus is shown applied to a railway car 10 having wheeled trucks which include side frames 11 constituting unsprung portions of the car and a bolster 12 constituting a sprung portion of the car. The air brake apparatus here shown includes a brake pipe 13, a control valve mechanism 14, a supply reservoir 15 and a brake cylinder 16. The brake pipe 13 includes the usual flexible hose members 17 and 18 adapted for connection with adjacent cars and is also provided with conventional angle cocks 19 and 20. This air brake apparatus also includes a conventional retaining valve 21 which is connected with the control valve mechanism 14 by the pipe 22. The supply reservoir 15 and the brake cylinder 16 are connected, respectively, with the control valve mechanism 14 by the pipes 23 and 24. The railway car 10 is provided with hydraulic pressure generating devices 25 and 26 which constitute a part of a load-responsive mechanism and will be described in greater detail hereinafter. These hydraulic pressure generating devices are connected with the control valve mechanism 14 by a pipe line 27 which includes branch pipes 25a and 26a.

The control valve mechanism

The control valve mechanism 14 will now be described in greater detail and, from Figs. 1 and 2, it will be seen that the housing of this mechanism comprises three sections 28, 29 and 30 of which the section 28 is an intermediate section and the sections 29 and 30 constitute end sections which are connected to opposite sides of this intermediate section. The intermediate section 28 also constitutes a mounting bracket adapted to be bolted or otherwise attached to the structure of the car 10 for mounting the control valve mechanism 14 thereon. The housing section 29 comprises a hollow member or bulb having therein a chamber 31 which serves as the auxiliary reservoir. The housing section 30 is also in the form of a hollow member or bulb having a chamber 32 therein which serves as a control chamber and is conveniently referred to as an application chamber. The housing section 29 also contains a service piston 33 and an emergency piston 34. The housing section 30 also contains a relay valve mechanism 35 which will be further described hereinafter.

The intermediate housing section 28 is provided with substantially flat faces 36 and 37 on opposite sides thereof against which the end housing sections 29 and 30 are bolted or otherwise secured. Between the side faces 36 and 37 the intermediate housing section 28 is provided with a fulcrum chamber 38, an exhaust chamber 39 and a control chamber 40. The latter chamber is hereinafter referred to at times as an "emergency and release control chamber" or simply as a control chamber. The intermediate housing section 28 is also provided at a suitable point thereof with tapped openings with which the above-mentioned pipes 13, 22, 23 and 24 are connected, as shown in Fig. 2. This housing section is also provided with a passage 39a connecting the exhaust chamber 39 with atmosphere and which passage is controlled by a suitable insect guard 41.

The housing section 29 of the control valve mechanism 14 is closed at its inner end by a generally flat substantially disk-shaped member 42 which, as hereinafter described, constitutes a carrier for certain of the valve devices. The carrier 42 cooperates with the housing section 29 in defining the auxiliary reservoir 31 and can be connected with the open end of this housing section by being snugly seated in a counterbore 43. The depth of the counterbore 43 is such that the outer face of the carrier 42 will be substantially flush with the end face of the housing section 29 and when the latter is connected with the intermediate housing section 28, the outer face of the carrier will be clamped against the flat face 36 of the intermediate housing section. A sheet 44 of suitable gasket material may be provided between the carrier 42 and the intermediate housing section 28.

The carrier 42 also forms a support for an adapter member 45 and a body 46 having a cover 47 thereon. The adapter member 45 is a substantially flat, disk-like member located between the body 46 and the carrier 42. The body 46 is provided at its inner end with a disk-like base portion 48 having a substantially flat face in engagement with the adjacent face of the adapter member 45.

Figure 2:
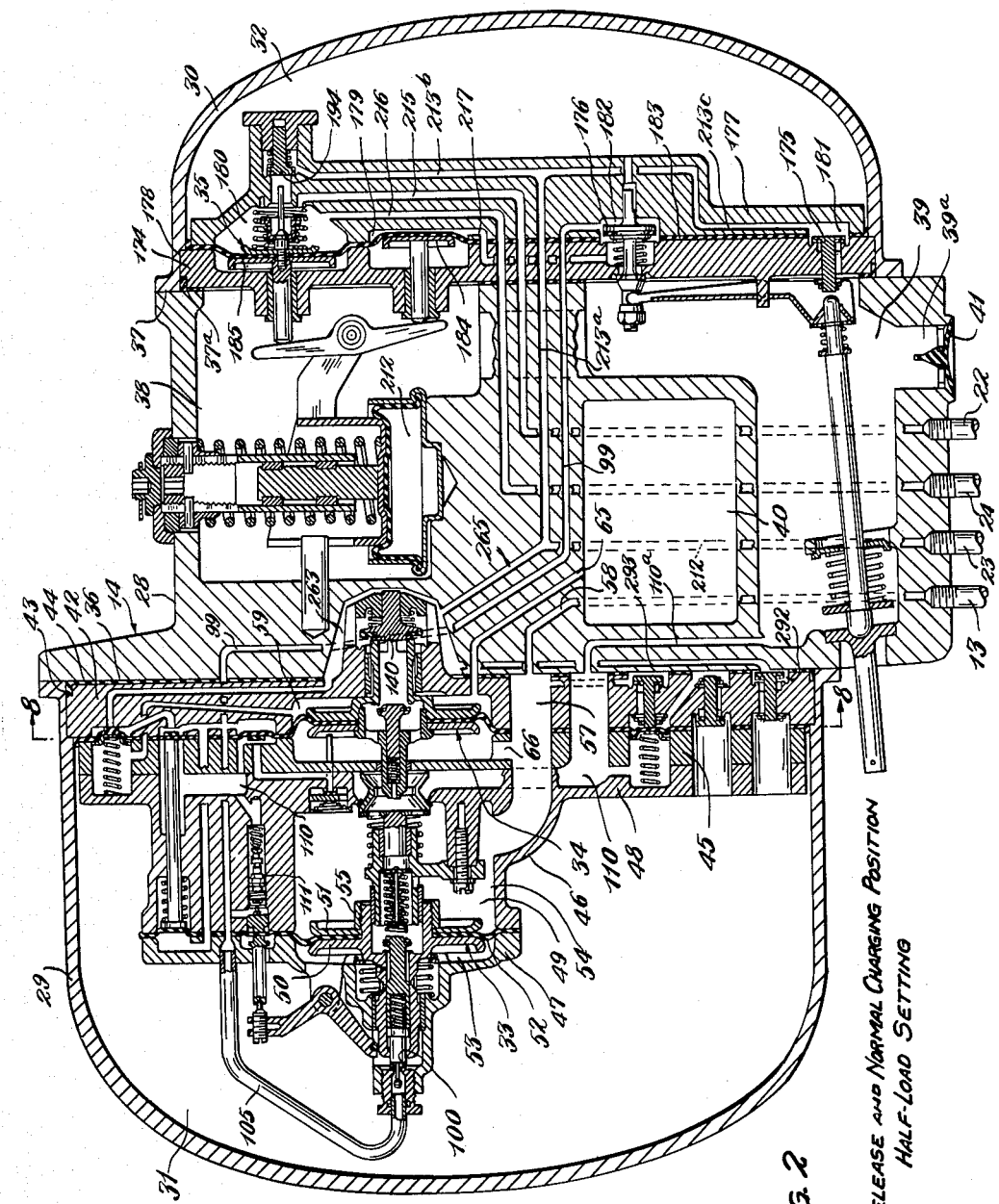
Fig. 2 is a longitudinal section, somewhat diagrammatic in form, taken through the control valve mechanism of the air brake apparatus of Fig. 1, the control valve mechanism being shown in released and normal charging position and with the load responsive mechanism at half-load setting.

As shown in Fig. 2 the body 46 and its cover 47 cooperate in defining a piston chamber 49 in which the service piston 33 is located. The service piston 33 is formed, in part, by a pair of cooperating disk members 50 and 51 and, in part, by a flexible diaphragm 52 whose outer portions are clamped between the body 46 and the cover 47. The central portion of the diaphragm 52 extends across the chamber 49 and divides the same into a pair of compartments 53 and 54. The piston members 50 and 51 are clamped against opposite sides of the central portion of the diaphragm 52 as by means of a clamping nut 55. The compartment 53 is in open communication with the auxiliary reservoir 31 through the passage 56 and the compartment 54 is in direct communication with a chamber 57 which can be conveniently termed a brake pipe chamber. A passage 58 provided in the intermediate housing section 28 connects the brake pipe chamber 57 with the brake pipe connection 13.

The carrier 42 and the adapter member 45 cooperate in defining a chamber 59 in which the emergency piston 34 is located. The emergency piston chamber 59 lies inwardly of the service piston chamber 49, but is located in substantially coaxial relation to the service piston chamber. The emergency piston 34 is formed, in part, by a pair of piston members 60 and 61 and, in part, by a flexible diaphragm 62 extending across the emergency piston chamber and dividing the latter into compartments 63 and 64. The outer portions of the diaphragm 62 are clamped between the carrier 42 and the adapter member 45 and the central portion of this diaphragm is clamped between the piston members 60 and 61. The compartment 63 of the emergency piston chamber is in direct communication with the emergency and release control chamber 40 through a passage 65 formed in the intermediate housing section 28. The compartment 64 is in direct communication with the brake pipe chamber 57 through the passage 66 of the adapter member 45.

The service piston

The service piston 33 is supported and guided for movement axially of the chamber 49 by means of a pair of axially spaced bearing holders 67 and 68. The bearing holder 67 is in the form of a sleeve having a central passage 69 therein and having substantially radially projecting arms 70 by which this bearing holder is mounted on posts 71 of the body 46 and secured to such posts by screws 72. The piston member 50 of the service piston 33 is provided with a central hub portion 73 having therein a valve chamber 74 into which a sleeve portion 75 of the bearing holder 67 extends. A bushing 76 mounted on the sleeve portion 75 forms a bearing on which the hub portion 73 of the piston member 50 is slidably guided.

The bearing holder 68 is formed as an axial extension of the cover 47 of the body 46 and has a bushing 77 mounted therein. The hub portion 73 of the piston member 50 has a tubular integral extension 78 formed thereon which extends into the bearing holder 68 and is slidably guided in the bushing 77. The extension 78 has an axial passage 79 therein which at its inner end is connected with the valve chamber 74 of the hub portion 73.

The service piston 33 is shown in Figs. 2 and 3 as being in its release or normal charging position. Movement of the piston toward this position is limited by a yieldable abutment or stop which, in this instance, is in the form of a ring 80 which is slidable in an axial chamber 81 of the cover 47 and which sliding movement is resisted by a compression spring 82 located in this chamber. The spring 82 is maintained under compression in the chamber 81 by providing the wall of the latter with an internal groove in which a locking ring 83 engages and forms a stop against which the abutment ring 80 is held by the spring.

Figures 6, 10:
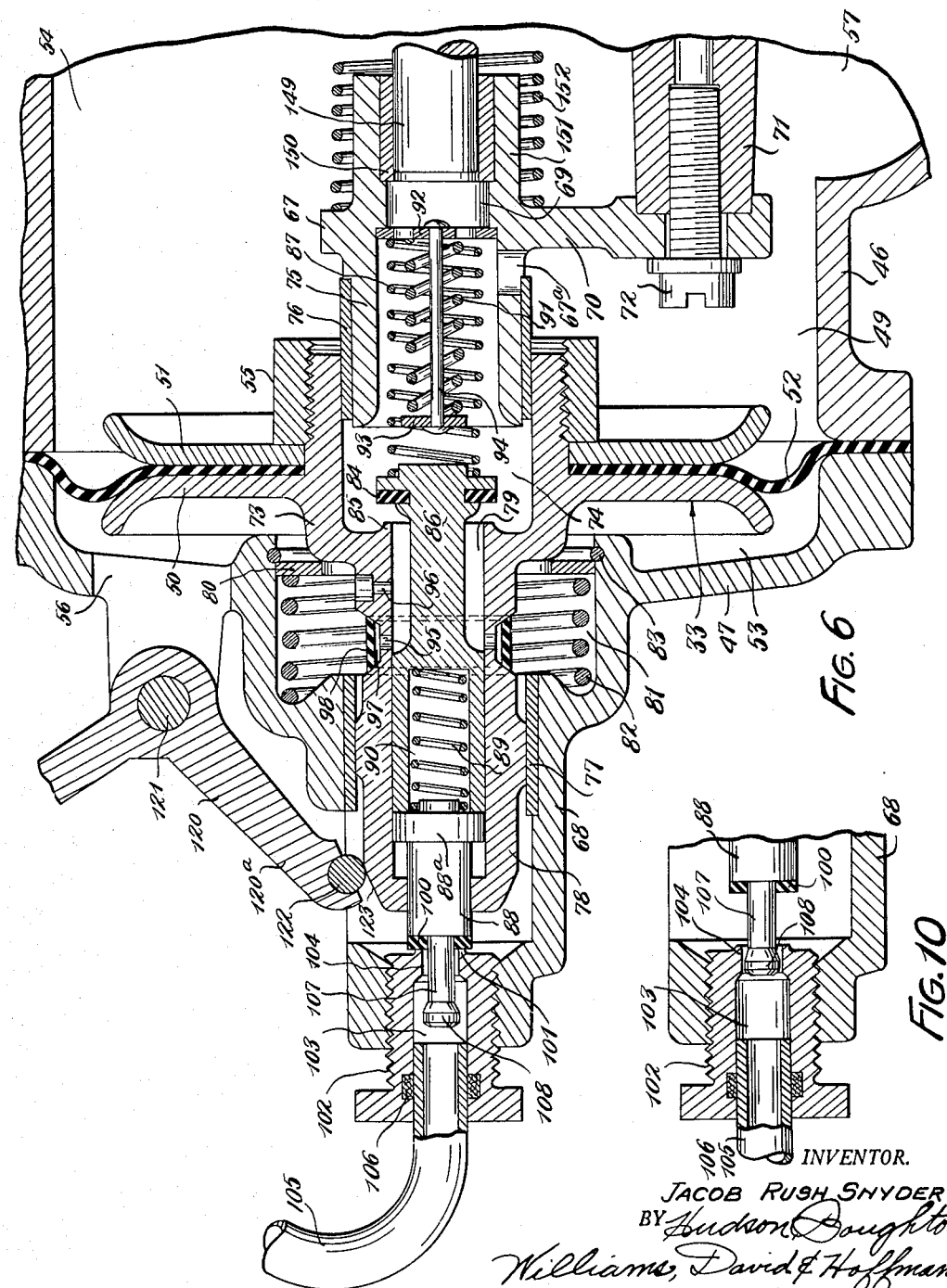
Fig. 6 is a larger scale fragmentary longitudinal section showing the service piston and the mechanism adjacent thereto.
Fig. 10 is a larger scale fragmentary detail view in longitudinal section showing the application chamber inlet valve in the second stage emergency position.

The connection of the passage 79 of the service piston stem 78 with the valve chamber 74 is controlled by a charging valve 84 which cooperates with a valve seat 85 extending around the inner end of the passage 79. The valve 84 is carried by a plunger 86 which is slidable in the passage 79. The valve 84 is normally held in its closed position by a spring 87 seating in an axial recess of the bearing holder 67. Opening of the valve 84 is accomplished by movement of the piston 33 toward the left as seen in Figs. 3 and 6 which causes the valve seat 85 to move away from the valve 84. For a purpose to be presently explained another plunger 88 is provided at the outer end of the plunger 86 and has a head 88a slidable in the passage 79 of the service piston stem 78. A spring 89 is located in an axial recess 90 of the plunger 86 and acts on the head 88a to urge the plunger 88 in a direction axially outwardly of the piston stem 78 (toward the left as seen in Figs. 3 and 6). Closing of the valve 84 is accomplished by movement of the piston 33 toward the right and thereafter this valve moves along with the piston in opposition to the spring 87. A preloaded spring 91 located in the bearing holder 67 in coaxial relation to the spring 87 serves as a stop for limiting such movement of the piston 33 during service applications of the brake. The spring 91 is preloaded by being confined between a pair of spring seats 92 and 93 which are prevented from moving apart more than a fixed distance by the tie rod 94.

Air supplied to the brake pipe chamber 57 by the brake pipe 13 passes directly into the compartment 54 of the service piston chamber 49 and then through the radial passage 67a of the bearing holder 67 into the valve chamber 74 of the service piston 33. When the valve 84 is open, brake pipe pressure then passes directly from the valve chamber 74 into the passage 79 for delivery into the auxiliary reservoir 31. The flow of air from the passage 79 into the auxiliary reservoir takes place through a group of radially extending charging ports 95 of the piston stem 78 and also through a continuously open equalizing port or orifice 96. The charging ports 95 communicate with an annular groove 97 extending around the piston stem 78 and are controlled by an annular valve member 98 located in this groove.

The valve member 98 is here shown as being an elastic band formed of rubber or other elastic material. The groove 97 is preferably formed with inclined outwardly divergent side walls and the elastic valve member 98 is formed with similar convergently inclined side edges which seat against the inclined side walls of the groove. When the pressure in the auxiliary reservoir 31 is materially lower than the pressure in the brake pipe chamber 57 and the valve 84 is open, the brake pipe pressure flows through the ports 95 and unseats the valve member 98 to permit a relatively rapid charging of the auxiliary reservoir. When the pressure of the auxiliary reservoir 31 approaches or reaches the pressure of the brake pipe chamber 57, the valve member 98 thereafter remains seated and small or gradual pressure changes occurring in the brake pipe are equalized with the auxiliary reservoir through the equalizing port 96.

The fluid pressure in the application chamber 32 is supplied thereto from the auxiliary reservoir 31 and for this purpose the intermediate housing section 28 of the control valve mechanism 14 is provided with a passage 99 which also extends through the carrier 42, the adapter member 45, the body 46 and the cover 47. The discharge end of the passage 99 is not connected with the application chamber 32 directly but through the valve chamber 182 as hereinafter described, or through the valve chamber 182 and the piston chamber 179a of the relay valve means 35 as shown in the modified construction of Fig. 15. The delivery of pressure fluid to the application chamber 32 from the auxiliary reservoir 31 through the passage 99 is controlled by an inlet valve or application chamber supply valve 100 which is carried by the plunger 88 and cooperates with a valve seat 101 formed on a screw plug 102 which is mounted in the outer end of the bearing holder extension 68 of the cover 47. The screw plug 102 is adjustable in the extension 68 for properly locating the valve seat 101 and has an axial passage 103 therein which communicates with the auxiliary reservoir through a port 104. The passage 103 of the plug 102 is connected with the supply passage 99 to the application chamber through a bent tube 105. As shown in Fig. 3, the tube 105 has one end thereof secured in the outer end of the passage 99 as by the solder 105a, or by a suitable clamping and packing means (not shown), and has its other end engaged in the passage 103 of the plug 102 and sealed therein by means of the packing 106.

When the service piston 33 is in its release or charging position, the inlet valve 100 is in its closed position in engagement with the valve seat 101 and is maintained in such closed position by the action of the spring 89 on the plunger 88. Upon the occurrence of service and emergency reductions in brake pipe pressure, the service piston 33 is shifted toward the right by the pressure differential of the auxiliary reservoir 31 and brake pipe chamber 57 acting thereon and this causes the inlet valve 100 to be opened to supply pressure fluid through the passage 99 to the application chamber, as will be more fully explained hereinafter.

For controlling the port 104 during an emergency application of the brake, the plunger 88 is provided with a stem extension 107 of reduced size which extends through the port into the passage 103 and carries a head 108 which serves as a restricting element or choke member. During service applications of the brake, the piston 33 moves toward the right against the action of the spring 87, but movement of the piston in this direction is limited by the preloaded spring 91 which acts as a stop. During movement of the piston 33 within the distance permitted by the stop 91, the valve 100 will be disengaged from the seat 101 to permit pressure fluid from the auxiliary reservoir 31 to flow into the pipe 105 through the port 104 and in surrounding relation to the stem 107. The preloaded spring 91 serves very well as a stop, as just described above, but can be omitted if desired since a satisfactory actuation of the valve 100 will be obtained even if no stop is employed.

When an emergency application of the brake is made, the differential pressure acting on the piston 33 is of a substantially greater force than during a service application and causes the piston to compress the preloaded spring 91 as well as the spring 87. This greater movement of the piston 33 during the emergency application causes the valve 100 to be disengaged from the seat 101, as just explained above, but also continues to move the plunger 88, causing the restricting head 108 to be moved into the port 104 to the position shown in Fig. 10. The diameter of the head 108 is of a size relative to the diameter of the port 104 such that only a small annular clearance remains therebetween forming a restricted connection between the passage 99 and the auxiliary reservoir 31.

The release of the pressure fluid from the application chamber 32 is also controlled in response to movement of the service piston 33. When the brake is to be released, the pressure of the application chamber is vented to atmosphere through the passage 99 and through passage portions 109 and 109a of which the latter communicates with a vent chamber 110 and is controlled by a vent valve 111. The vent chamber 110 is always connected with the exhaust chamber 39 through the passage 110a. The vent valve 111 is mounted in a chamber 112 constituting an enlargement of the passage 109 and is preferably in the form of a self-contained valve device of the kind used in the inflating stems of pneumatic tires. This valve device comprises a valve body or barrel 113 having a threaded head 113a thereon by which the valve device is mounted in the chamber 112 and a valve element 114 normally in engagement with the inner end of the barrel 113 for closing the passage extending through the barrel. The valve element 114 is adapted to be moved away from the end of the barrel 113 for opening the passage by means of a valve stem 115. A light spring 116 contained in the barrel 113 normally holds valve element 114 in its closed position and in this instance is also held in its closed position by an additional spring 117 which is located in the valve chamber 112 externally of the valve device 111.

During the release of the brake following either a service or an emergency application, the increasing pressure in the brake pipe and in the brake pipe chamber 57 shifts the piston 33 toward the left and this movement of the piston is used to shift the valve element 114 to its open position for venting the application chamber to the vent chamber 110. To utilize this movement of the piston 33 for this purpose, a pair of aligned plungers 118 and 119 are provided on opposite sides of the diaphragm 52 and are slidable, respectively, in the body 46 and the cover 47. The plunger 118 is in engagement with the valve actuating stem 115, as seen in Figs. 3 and 17, and when movement is imparted to shift the plungers 118 and 119 toward the right, the vent valve 111 is opened.

Motion is transmitted from the piston 33 to the plunger 119 through a bell crank lever 120 mounted on a pivot shaft 121. This bell crank lever has an arm 120a which cooperates with the stem extension 78 of the piston 33. The arm 120a is provided at the end thereof with an antifriction bearing element or roller 122 adapted to cooperate with a cam shoulder 123 carried by the stem extension 78. The other arm 120b of the bell crank lever has a forked end in which a threaded thrust pin 124 is mounted and the inner end of this thrust pin has a reduced portion 124a engaging in a recess 125 provided in the outer end of the plunger 119.

During movement of the piston 33 toward the left in releasing the brake, the bell crank lever 120 will be rocked in a clockwise direction to cause the plunger 118 to open the vent valve 111. During the initial movement of the piston 33 toward the right during an application of the brake, the bell crank lever 120 will be rocked in a counterclockwise direction by the action of the spring 117 which then also moves the valve member 114 to its closed position.

The emergency piston

As mentioned above, the emergency piston 34 includes a pair of cooperating piston members 60 and 61 of which the piston member 60 is provided with an enlarged central hub portion 126 having a chamber 127 therein. These piston members are held in clamped engagement with opposite sides of the diaphragm 62 by means of a nut 128 which also forms a cover for the chamber 127 and such cover having openings 129 therein which connect the chamber 127 with the compartment 64 of the piston chamber 59. The emergency piston 34 is supported for axial movement in the chamber 59 by means of a pair of bushings 130 and 131. The bushing 130 is mounted in the axial passage of a central extension portion 132 of the carrier 42. The bushing 131 is mounted in a central opening of the adapter 45. For mounting the piston 34 in the bushings 130 and 131, the hub portion 126 of the piston member 60 has a hollow stem extension 133 which is slidable in the bushing 130 and the clamping nut 128 has a hollow stem extension 134 which is slidable in the bushing 131. The hollow stem 133 of the piston member 60 has an axial passage 135 therein and the stem extension 134 of the nut 128 has an axial bore 136 therein. As shown in Fig. 7, the end of the stem 133 has fingers 133a thereon with spaces or openings 133b therebetween.

The inner end of the extension portion 132 of the carrier 42 is provided with a group of axially extending fingers 137 which support a bearing block 138. The extension portion 132 is also provided adjacent the base of the fingers 137 with an annular valve seat 139. A valve member 140 having a stem 140a slidable in the bearing block 138 is normally held in engagement with the valve seat 139 by a spring 141 but is adapted to be disengaged from such seat by the inner end of the hollow stem 133 during movement of the emergency piston 34 to the position shown in Figs. 3 and 7.

The hub portion 126 of the emergency piston 34 has a valve seat 142 formed thereon so as to be located in the chamber 127. A check valve member 143 located in the chamber 127 cooperates with the seat 142 and is normally held thereagainst by a spring 144 located in the bore 136 of the nut extension 134. The check valve member 143 is axially movable in the chamber 127 and is guided during this movement by having a stem 143a slidable in the bore 136.

The emergency vent valve

As shown in Figs. 3 and 7 the body 46 is provided with an emergency vent opening 145 which is in direct communication with the vent chamber 110 and is surrounded by an annular valve seat 146. The emergency vent passage 145 is controlled by an emergency vent valve 147 and it is important to note that in this instance the emergency vent valve is a balanced valve. The valve 147 is preferably a poppet type valve and is of a substantially hourglass shape. This valve is hollow and is carried by a spider 148 which, in turn, is mounted on the inner end of an axially movable stem 149. The stem 149 is slidable in a bushing 150 mounted in the sleeve portion 151 of the bearing holder 67. A spring 152 surrounding the sleeve portion 151 of the bearing holder 67 acts on the spider 148 for urging the balanced valve 147 towards its closed position.

During an emergency application of the brake the emergency piston 34 is shifted suddenly toward the left, causing the end of the stem extension 134 to engage the guide stem 149 of the balanced valve 147 and shift this valve to its open position in opposition to the spring 152. The opening of the valve 147 causes the brake pipe chamber 57 and the compartment 54 to be placed in direct communication with the vent chamber 110 through the passage 145 and through the hollow valve itself, to thereby quickly vent the brake pipe 13 to atmosphere.

The balanced valve 147 is a hollow annular member of substantially hourglass shape, as mentioned above, and has two seating portions 153 and 154 thereon. The seating portion 153 is an annular strip-like member which is bonded or otherwise connected to one of the convergently sloping external annular faces of the valve. This seating element is formed of rubber or other suitable yieldable material and is engageable with the annular seat 146 when the valve is in its closed position. The other seating element 154 is a ring-shaped member of a tapered cross-sectional shape which is bonded or otherwise connected to the inner end face of the valve member 147 and is adapted to seat against a valve seat which, in this instance, is provided by the flat surface of the adapter 45. The seating element 154 is made of rubber or other suitable resilient material and is compressible against the adapter 45 when the valve 147 is moved to its closed position. This seating element 154 has an axial thickness and yieldability such that during the closing movement of the valve 147 it will engage the surface of the adapter 45 and will be compressed or deflected thereagainst for an amount to permit good seating engagement of the element 153 against the annular valve seat 146.

Quick-service venting

To accomplish a quick-service venting of the brake pipe 13, the control valve mechanism 14 is provided with a quick-service venting means which will be described next. This quick-service venting means comprises a valve seat 155 formed on the body 46 (see Figs. 3 and 7) and a valve member 156 cooperating with such seat and adapted to be moved to open position by the emergency piston 34. The valve seat 155 is located around a vent passage 157 which includes a passage portion 157a formed in the adapter 45 and connected with the vent chamber 110 through a valve chamber 158 and a connecting passage 159.

The valve member 156 is carried by a valve plate 160 which is slidable in a valve chamber 161 of the body 46. A conical spring 162 located in the valve chamber 161 acts on the valve plate 160 for normally holding the valve member 156 in engagement with the valve seat 155. The large outer end of the conical spring 162 is anchored on the body 46 by being engaged in an internal annular groove 163 of the valve chamber 161. Movement for opening the valve member 156 is transmitted to the valve plate 160 from the emergency piston 34 by the push pins 164.

During a service application of the brake, an initial reduction of brake pipe pressure is made by actuation of the engineer's brake valve. This initial reduction causes a movement of the emergency piston toward the left, which is ordinarily an idle movement because it is insufficient to cause opening of the emergency vent valve 147 but, in accordance with this invention, this movement of the emergency piston is utilized to cause opening of the vent valve 156 for producing a quick-service venting of the brake pipe to the atmosphere.

The quick-service vent passage 157, 157a is also controlled by a valve member 165 located in the valve chamber 158 and which, in this case, is carried by a portion 166 of the flexible diaphragm 62. A chamber 167 formed in the carrier 42 and located on the opposite side of the diaphragm 62 is always in direct communication with the passage 99, and hence, is subject to the pressure of the application chamber 32 whenever pressure is supplied to the latter through the passage 99. Therefore, whenever application chamber pressure builds up in the chamber 167 it flexes the diaphragm portions 166 on which the valve member 165 is mounted and holds this valve member in seating engagement to close the quick-service vent passage 157a. However, when the quick-service vent valve 156 is opened by the initial movement of the emergency piston 34, as explained above, brake pipe pressure flows through the quick-service vent passage 157, 157a causing opening of the valve member 165 and producing a quick-service venting of the brake pipe into the vent chamber 110, and this quick-service venting continues until application chamber pressure builds up sufficiently in the chamber 167 to close the valve member 165.

*The emergency and release control chamber*

The emergency and release control chamber 40 is normally charged with pressure and when an emergency reduction occurs in the brake pipe, the pressure of the compartment 64 of the emergency piston chamber 59 is reduced. The release control chamber 40 is in direct communication with the compartment 63 through the connecting passage 65. The resulting pressure differential between the compartments 63 and 64 causes the pressure of the release control chamber 40 to act on the emergency piston 34, shifting the latter quickly toward the left to cause opening of the emergency vent valve 147. The opening of this vent valve produces a rapid emergency venting of the brake pipe which results in a quick movement of both emergency and service pistons to the full emergency position and in the desired emergency functioning of the various other parts of the apparatus which will be described hereinafter.

When the reduction in brake pipe pressure is only a service reduction, it is desirable to release the pressure of the control chamber 40 so that this pressure will not cause an emergency actuation of the piston 34 which would otherwise result in an undesired emergency application of the brake. For this purpose, a plurality of circumferentially spaced axially extending leakage grooves 172 (see Fig. 7) are provided in the outer surface of the hollow stem 133 of the emergency piston 34 and extend for a portion of the length of this stem. The grooves 172 are of a length such that their ends will overlap a counterbore 173 provided in the bushing 130 when the emergency piston is in the release and normal charging position shown in Figs. 2, 3 and 7. The grooves 172 are also in overlapping relation to the counterbore 173 while the apparatus is in the quick service and service positions. During quick service and during a service application of the brake the valve 140 remains closed.

Upon the occurrence of a service reduction in brake pipe pressure, the pressure in the control chamber 40 is relieved by the flow of fluid therefrom through the grooves 172 and the counterbore 173 which are then in communication. This escaping fluid then flows around the end of the hollow stem 133, as permitted by the fingers and openings 133a and 133b, into the passage 135. This release of pressure fluid from the control chamber 40 into the brake pipe chamber 57 occurs while the brake pipe pressure is being vented to atmosphere and, in a strictly technical sense, does offset the reduction being made in brake pipe pressure but the control chamber 40 is of such small volume that the release of its pressure fluid into the brake pipe chamber at this time produces no noticeable retardation of the brake pipe reduction being made. When an emergency reduction in brake pipe pressure is made, the resulting movement of the emergency piston 34 toward the left is of sufficient extent to shift the groove 172 out of register with the counterbore 173, thereby temporarily trapping the pressure fluid in the control chamber 40 and the compartment 63 so that it will be fully effective on the emergency piston 34 for shifting the latter toward the left for the full travel for opening the emergency vent valve 147. In accomplishing this function the grooves 172 and the counterbore 173 thus serve as a valve means which remains open during the occurrence of a service reduction in brake pipe pressure but is automatically closed during the occurrence of an emergency reduction.

After the emergency piston 34 has been shifted to the left to cause opening of the emergency vent valve 147 as the result of an emergency reduction in brake pipe pressure, it is desirable to relieve the pressure in the control chamber 40 so that various other desired functions of the apparatus can take place in proper sequence. The pressure in the control chamber 40 is relieved at this time through a clearance space provided between the hollow stem 133 and the bushing 130 and which space forms a leakage path through which this pressure fluid can escape and travel around the end of the stem into the passage 135. The clearance provided between the hollow stem 133 and the bushing 130 for this purpose can be on the order of a few thousandths of an inch, but can be varied to suit the operating characteristics of the particular brake mechanism in which it is provided.

*The application chamber*

The housing member 30 is provided at the inner end thereof with a closure member or carrier 174 (see Figs. 2 and 4) which cooperates with this housing member in defining the application chamber 32. The member 174 is referred to as a carrier because it provides a support for the relay valve mechanism 35 and for the vent valves 175, 176 and 225 which will be described hereinafter. The carrier 174 also forms a support to which an adapter member 177 is connected. The carrier 174 is an annular disk-like member having the outer edge thereof received in a counterbore 178 of the housing member 30 so that when the latter is connected with the intermediate housing section 28, the carrier will be clampingly held against the face 37 of the latter with a gasket 37a therebetween.

*The relay valve mechanism*

The carrier 174 and the adapter 177 have cooperating portions which define a pair of piston chambers 179 and 180 for the relay valve mechanism 35 and also define valve chambers 181 and 182 for the vent valves 175 and 176, respectively. A flexible diaphragm 183 is clamped between the carrier 174 and the adapter 177 and forms a gasket therebetween with portions of this diaphragm extending across the chambers 179 and 180 of the relay valve mechanism 35 to constitute operating portions of this relay valve means.

The relay valve mechanism 35 comprises pistons 184 and 185 (see Fig. 4) located in the chambers 179 and 180, respectively. The piston 184 is formed, in part, by a disk-member or head 184a and, in part, by a portion 183a of the diaphragm 183. The piston head 184a is carried by a stem 186 which is slidable in a bushing 187 of the carrier 174. The piston 184 divides the chamber 179 into two compartments 179a and 179b, of which the compartment 179a is a pressure compartment for causing actuation of the piston 184 and the compartment 179b is vented to the atmosphere through a leakage space formed by a clearance or tolerance provided between the stem 186 and the bushing 187.

The piston 185 is formed, in part, by a disk or head 185a and, in part, by the diaphragm portion 183b. The piston head 185a is carried by a stem 188 which is slidable in a bushing 189 of the carrier 174. The piston 185 divides the chamber 180 into two compartments 180a and 180b, of which the compartment 180a is a pressure compartment. The compartment 180b is vented to atmosphere through a leakage passage formed by a clearance or tolerance provided between the stem 188 and the bushing 189.

The relay valve mechanism 35 also includes a valve chamber 190 located adjacent the chamber 180 and connected therewith by a passage 191. An annular valve seat 192 is formed on or carried by the adapter 177 and is located in the valve chamber 190 in surrounding relation to the adjacent end of the connecting passage 191. A second annular valve seat 193 is formed on or carried by the adapter 177 at the other end of the passage 191 and is located in the piston chamber 180. A valve 194 located in the valve chamber 190 is normally held in engagement with the valve seat 192 by the spring 195. The valve 194 is here shown as having a stem 196 which is slidable in an axial bore 197 of a screw plug 198 which forms a closure for the valve chamber.

A valve 199 in the form of a flat ring is provided in the piston chamber 180 for cooperation with the annular valve seat 193. The valve 199 is mounted on the radial flange 200 of a cup-shaped valve carrier 201 which is attached to the piston 185 by means of the shouldered screw 202. The screw 202 has a head portion 203 which is spaced from the piston by means of the intervening spacer or shoulder 204. The head portion 203 of the screw is located in the cup-recess of the valve carrier 201 and the spacer portion 204 extends through an opening in the bottom of the valve carrier. The wall of the cup-shaped portion of the valve carrier 201 has openings 201a therein which connect the passage 191 with the chamber 180a when the valve member 199 is in engagement with the seat 193.

The valve carrier 201 has limited axial shifting movement on the spacer 204 and relative to the piston 185 but is normally urged in a direction away from the piston by the spring 205. The screw 202 also carries a stem extension 206 formed as an integral part of the head 203 and which extends into the passage 191 and is engageable with the valve 194 for shifting the latter away from the valve seat 192 in opposition to the spring 195.

The piston 185 is normally shifted toward a retracted position by a spring 207, that is to say in a direction to permit closing of the valve 194 and cause opening of the valve 199. The spring 207 has one end thereof in engagement with the adapter 177 in surrounding relation to the valve seat 193 and its other end in engagement with a spring seat 208 carried by the piston 185. The spring seat 208 also serves as a clamping member for the diaphragm 183 and is clamped to the head 185a by the threaded engagement of the screw 202 in the stem 188. With respect to the spring 207 it should be understood that the relay valve mechanism will function satisfactorily without this spring and, hence if desired, this spring can be omitted.

Movements of the pistons 184 and 185 are transmitted from one to the other through a fulcrum lever 209 which is pivoted on a fulcrum pin 210. The lever 209 has arms 209a and 209b extending in opposite directions from the fulcrum pin 210 and engaging, respectively, the piston stems 186 and 188. The fulcrum pin 210 is carried by a bracket 211 which constitutes a part of a load-responsive mechanism 212 which is located in the fulcrum chamber 38 and will be described hereinafter.

Pressure fluid is supplied to the valve chamber 190 of the relay valve means 35 from the supply reservoir 15 through the pipe 23, the passage 212 and the passage portions 213a and 213b. An annular groove 214 formed in the valve seat 193 is connected with the atmosphere through the passage 215, the pipe 22 and the retaining valve 21. The compartment 180a is connected with the brake cylinder 16 through the passage 216 and the pipe 24. Pressure fluid is adapted to be supplied to the compartment 179a of the valve chamber 179 from the auxiliary reservoir 31 through passage means which includes the above-mentioned passage 99 and the passage portion 217.

*Service application*

Figure 4:
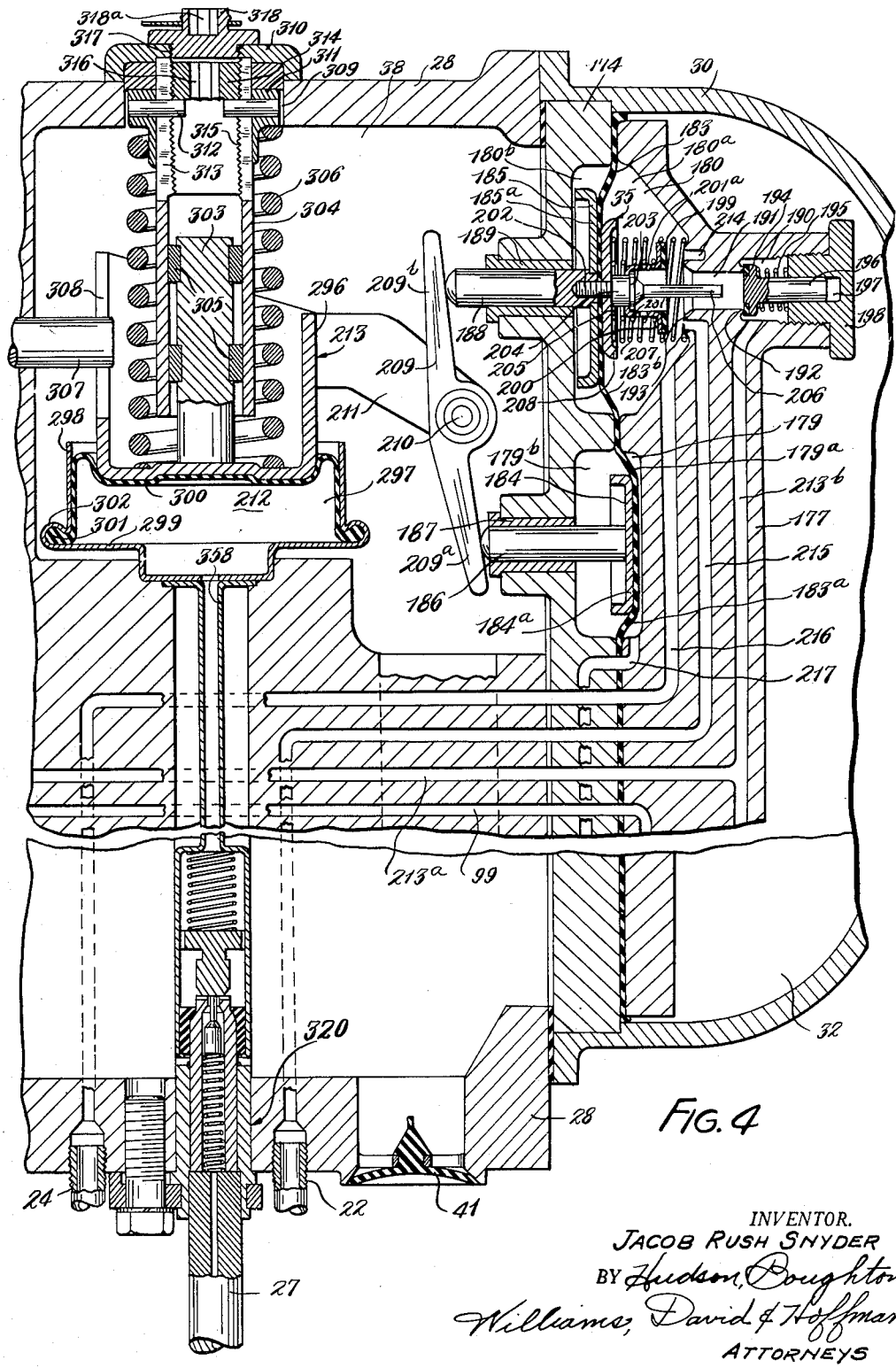
Fig. 4 is a fragmentary view of the control valve mechanism corresponding with the portion of Fig. 2 in which the load responsive means and the relay valve means are located but showing this portion of the mechanism on a larger scale.

From the construction thus far described above it will be seen that when a service reduction is made in brake pipe pressure it causes actuation of the service piston 33 which causes the valve 100 to be opened to supply pressure fluid from the auxiliary reservoir 31 through the passage 99 to the application chamber 30 and the relay valve means 35. This results in fluid of substantially the pressure value of the application chamber 30 to be supplied to the compartment 179a of the relay valve means 35 through the passage 217. This causes a working stroke of the piston 184 toward the left, as seen in Fig. 4, which results in rocking of the lever 209 on the fulcrum pin 210. The rocking of this lever causes the piston 185 to be shifted toward the right in the piston chamber 180 in opposition to the spring 207, thereby moving the valve 199 into engagement with the seat 193. When the valve 199 engages the seat 193 it overlies and covers the annular groove 214, thereby disconnecting the exhaust passage 215 from the compartment 180a.

The piston 185 continues to move toward the right after engagement of the valve 199 with the seat 193, as is permitted by the shifting of the valve carrier 201 on the spacer portion 204 of the screw 202, and this continued movement of the piston causes the stem 206 to engage the valve 194 and shift the same away from the valve seat 192. The opening of the valve 194 permits pressure fluid from the supply reservoir 15 to flow through the pasage 191, through the compartment 180a, and then through the passage 216 and the pipe 24 to the brake cylinder 16 to cause a service application of the brake.

When the brake application being made is not an emergency application or is less than a full service application, the valve 100 is promptly reclosed after the delivery of pressure fluid from the auxiliary reservoir 31 to the application chamber 32 and the relay valve means 35. To explain this reclosing it is pointed out that the delivery of pressure fluid from the auxiliary reservoir to the application chamber upon opening of the valve 100 causes a decrease in auxiliary reservoir pressure which results in a pressure differential between the auxiliary reservoir and the brake pipe such that the service piston 33 is thereby shifted toward the left to reclose the valve 100.

The pressure fluid which is supplied to the compartment 179a of the relay valve mechanism 35 from the auxiliary reservoir 31 can be supplied to this compartment directly, as in the modified construction of Fig. 15, or can be supplied to this compartment through the application chamber 32 or in conjunction with the charging of the application chamber. In the construction illustrated in Figs. 2, 4 and 5, the pressure fluid is supplied to the compartment 179a of the relay valve means through the chamber 182 of the application chamber vent valve 176 substantially simultaneously with the charging of the application chamber. The valve chamber 182 is formed so as to consist of the two compartments 182a and 182b. An annular valve seat 218 formed on or supported by the carrier 174 extends around the wall of the chamber 182 at the junction of the compartments 182a and 182b. The passage 99 extending from the auxiliary reservoir is connected with the compartment 182a and the passage 217 which extends to the compartment 179a of the relay valve mechanism 35 is connected with the compartment 182b.

The compartment 182a of the vent valve chamber 182 is connected with the application chamber 32 through a passage 219 and a guide opening or bore 220. The compartment 182b is connected with the atmosphere through a passage 221 and the exhaust chamber 39. A valve seat 222 is formed on or supported by the carrier 174 on the side thereof adjacent the exhaust chamber 39 and extends around the passage 221.

The vent valve 176 is located in the compartment 182a and is carried by an actuating stem 223 which extends into the chamber 39 through the passage 221. The valve 176 is engageable with the seat 218 but is normally held in its open position by a spring 224. A second valve 225 carried by the stem 223 and located in the exhaust chamber 39 is normally held in engagement with the seat 222 by the action of the spring 224. The valve stem 223 includes an extension 226 which is slidable in the bore 220 and has a groove or flat 227 formed thereon and extending for a portion of its length. The stem extension 226 is of a size relative to the bore 220 such that a clearance or tolerance therebetween provides a leakage space forming a somewhat restricted connection between the compartment 182a and the application chamber 32 through which the latter can be charged.

Figure 5:
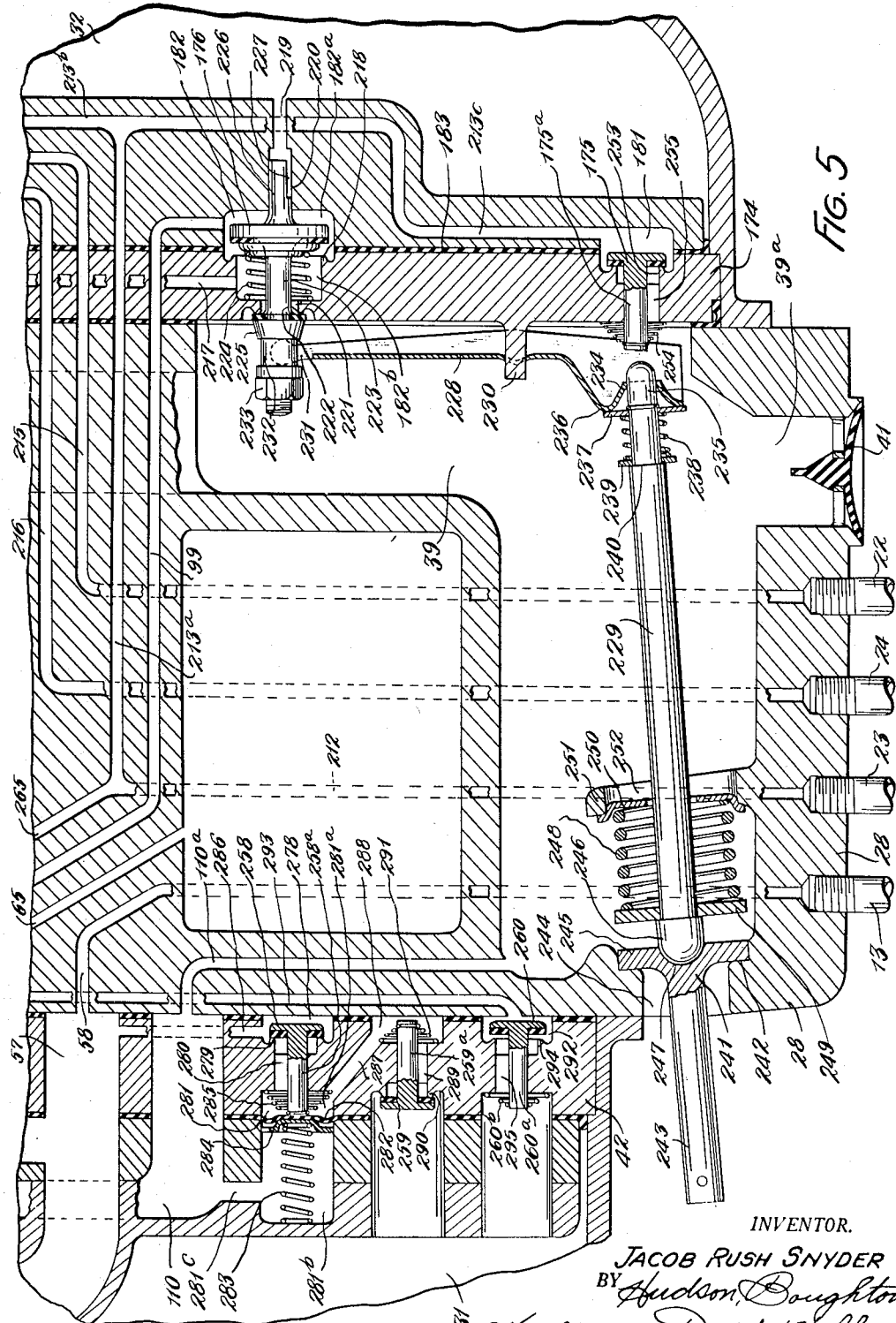
Fig. 5 is a fragmentary view of the control valve mechanism corresponding with the portion of Fig. 2 in which certain of the charging valves and manually operable vent valves are located but showing this portion of the mechanism on a larger scale.

When the pressure fluid is supplied to the compartment 179a from the auxiliary reservoir 31, as explained above, it passes quickly through the valve chamber 182 and begins to act on the relay valve mechanism even before the application chamber becomes fully charged. The final value of the pressure thus supplied to the relay valve means will, of course, be the pressure to which the application chamber becomes charged through the leakage space around the stem 226 and the passage 219. At this time the vent valve 225 is in engagement with the seat 222 and the valve 176 is in its open position as shown in Figs. 2 and 5.

With respect to the application chamber 32 it should be explained that the volume of this chamber is such that when a given portion of the pressure fluid in the auxiliary reservoir 31 is supplied thereto by the opening of the valve 100, the resulting pressure in the application chamber will be of a value to act on the relay valve mechanism 35 to cause a brake application of the desired force to be produced. Therefore, by making brake pipe pressure reductions of different values the engineer can cause the valve 100 to be opened for different amounts and this, acting in turn to cause the application chamber to be charged to different pressure values, will result in braking forces of corresponding different desired values to be developed by the brake cylinder 16.

At the time that the valve 194 is opened by the stem 206 of the piston 185 to cause pressure fluid to be supplied to the brake cylinder 16 from the supply reservoir 15, as explained above, there is little or no pressure in the chamber 180a of the relay valve means 35. While pressure fluid is being supplied to the brake cylinder 16, supply reservoir fluid is also being supplied to the chamber 180a and acts on the diaphragm portion 183. When the pressure on the diaphragm portion 183 balances the application chamber pressure acting on the diaphragm portion 183a in the chamber 179a, the spring 195 recloses the valve 194 to thereby discontinue the flow of supply reservoir fluid to the brake cylinder 16 and since the brake cylinder exhaust valve 199 remains closed the fluid previously supplied to the brake cylinder will be retained therein for holding the brake in the applied condition. The apparatus is now in service lap position.

*Release after service application*

The first step in the release of the brake after a service application is the charging of the brake pipe 13 with pressure from the locomotive which shifts the service and emergency pistons 33 and 34 to the positions shown in Figs. 2, 3, 6 and 7 and at which time the emergency piston stem 133 unseats the valve 140 to permit supply reservoir pressure to be returned to the brake pipe to assist the releasing operation. During such release of the brake after a service application, the pressure in the compartment 179a is vented to the atmosphere through the vent valve device 111 which, as explained above, is opened by motion transmitted through the lever 120 in response to release actuation of the service piston 33. This permits the spring 207 and fluid pressure in compartment 180a to impart a return stroke to the piston 185 and to transmit return movement to the piston 184 through the rocking lever 209. The return movement of the piston 185 moves the valve 199 away from the seat 193 thereby uncovering the annular groove 214. When the groove 214 is thus uncovered, the brake cylinder passage 216 is connected with the exhaust passage 215 through the compartment 180a whereupon pressure fluid is vented from the brake cylinder to atmosphere to permit the release of the brake.

*Release after emergency application*

If the application of the brake was either a service application or an emergency application, the release of the brake can be satisfactorily accomplished by the venting of the compartment 179a of the relay mechanism 35 through the vent valve device 111 which is opened by the release movement of the service piston 33, as explained above. If the application of the brake was an emergency application, it may sometimes be desirable to vent the compartment 179a by a manual venting operation for causing pressure fluid to be exhausted from the brake cylinder 16 for releasing the brake. One instance of when the manual venting of the compartment 179a is desirable for releasing the brake, occurs when a car is cut out of a train as during switching operations. At this time the brake pipe connections of the car are broken and the resulting rapid venting of the brake pipe causes an emergency application of the brake. By manually venting the compartment 179a the brake can be released following such an emergency application, as will now be explained, without venting the application chamber or the auxiliary and supply reservoirs.

This manual venting operation actuates the valve stem 223 in an outward direction relative to the chamber 182, that is to say by movement toward the left as seen in Fig. 5, thereby closing the valve 176 and opening the valve 225. The opening of the valve 225 connects the compartment 179a with the vent chamber 39 through the passage 217, the compartment 182b and the vent passage 221.

When the valve 176 is moved into engagement with the seat 218 by this manual venting operation the stem 226 is partially retracted from the bore 220, thereby moving the flat 227 far enough to extend partway into the compartment 182a, thus connecting the application chamber 32 with this compartment through the passage 219. The pressure from the application chamber acting on the valve 176 holds the latter against the seat 218, thereby preventing the loss of pressure fluid from the applicatoin chamber and making it unnecessary for the operator to manually hold the valve 225 in its open position. While the valve 176 is thus held in engagement with the seat 218, the passage 99 will be disconnected from the vent passage 221 and loss of the pressure fluid in the auxiliary reservoir at this time will also be prevented.

The manual actuation of the valve stem 223 in the accomplishment of the above described venting and brake releasing operation can be produced through a lever 228 and a push rod 229. The lever 228 is rockably fulcrumed on a fulcrum lug 230 of the carrier 174 and has a forked end 231 which straddles the valve stem 223 at a point outwardly of the valve 225. This forked end of the lever 228 engages in a reduced portion 232 of the valve 225 to provide an operating connection with the valve stem 223 on which the valve 225 is secured by means of the nut 233.

The other end of the lever 228 has an opening 234 in which the reduced end 235 of the rod 229 engages. An annular thrust seat 236 formed on this end of the lever 228 extends around the opening 234 and is engaged by a washer 237 which is slidably mounted on the reduced portion 235 of the push rod 229. A spring 238 disposed around the reduced rod portion 235 has one end in seating engagement with a seat formed by a washer 239 and a shoulder 240. The spring 238 is of such stiffness that when inward axial movement is imparted to the rod 229, the spring will not be initially flexed to any appreciable extent but will cause thrust to be applied to the seat 236 of the lever 228, thereby rocking this lever on the fulcrum lug 230 and producing an outward movement of the valve stem 223 for causing the above-explained opening of the valve 225 and closing of the valve 176. When the valve 176 has been closed by engagement with the seat 218, further outward movement of the valve stem 223 will be prevented and if continued inward axial movement is imparted to the push rod 229, the spring 238 will yield and the reduced portion 235 will move inwardly through the opening 234 of the lever 228. This relative movement of the reduced portion 235 inwardly through the opening 234 is used to actuate the supply reservoir vent valve 175 as will be further explained hereinafter.

Inward axial movement of the push rod 229 can be imparted thereto by a rockable actuating member or lever 241 which is rockably engaged in a seat 242 of the intermediate housing section 28. The actuating member 241 includes a lever portion 243 extending outwardly from the intermediate housing section 28 through the opening 244 of the latter. Tilting movement can be imparted to the lever portion 243 by manually grasping the same, or through a pull rod or pull wire attached thereto, and such tilting movement will cause the head portion 245 to react against the seat 242 to thereby produce an inward movement of this actuating member. An operating connection between the actuating member 241 and the push rod 229 can be formed by the engagement of a rounded head 246 of the push rod in a rounded socket 247 of the actuating member.

The inward movement of the actuating member 241 which is produced by the tilting of this member, as just described, imparts an inward axial movement to the push rod 229. An outward or return movement of the push rod 229 is produced by a spring 248 which is disposed around this rod and has its opposite ends in engagement with the spring seats 249 and 250. The spring seat 249 is mounted on the push rod 229 and bears against the head 246 thereof. The spring seat 250 bears against a lug 251 of the intermediate housing section 28 and is retained in place by engagement of a portion of the seat in an opening 252 provided in this lug and through which the push rod 229 extends.

Whenever it is found desirable to vent the pressure out of the supply reservoir 15, this can be done by means of the above-mentioned vent valve 175. This vent valve is located in the valve chamber 181 and is normally held in engagement with a valve seat 253 by means of the spring 254. The valve seat 253 extends around a passage 255 which connects the chamber 181 with the exhaust chamber 39. The valve 175 has a stem 175a which extends through and is slidable in an opening of the carrier 174. When the valve 175 is opened, pressure from the supply reservoir 15 flows through the pipe 23, the passage 212 and passage portions 213a and 213c into the chamber 181 and then through the passage 255 to the exhaust chamber 39.

The vent valve 175 is mounted on the carrier 174 so that the valve stem 175a will have its outer end located opposite from and adjacent to the inner end of the push rod 229. When the actuating member 241 is tilted to impart inward axial movement to the push rod 229, as explained above, and the inward movement of the push rod is greater than is needed to actuate the valves 176 and 225, the inner end of the push rod will then engage the valve stem 175a and will open the supply reservoir vent valve 175. The venting of the supply reservoir in the manner just explained continues as long as the vent valve 175 is manually held open by the push rod 229. When this venting has continued for the desired length of time, the actuating member 241 is released to permit the push rod 229 to be retracted by the spring 248, whereupon the vent valve 175 will be closed by the spring 254.

*Auxiliary valve devices*

Figure 8:
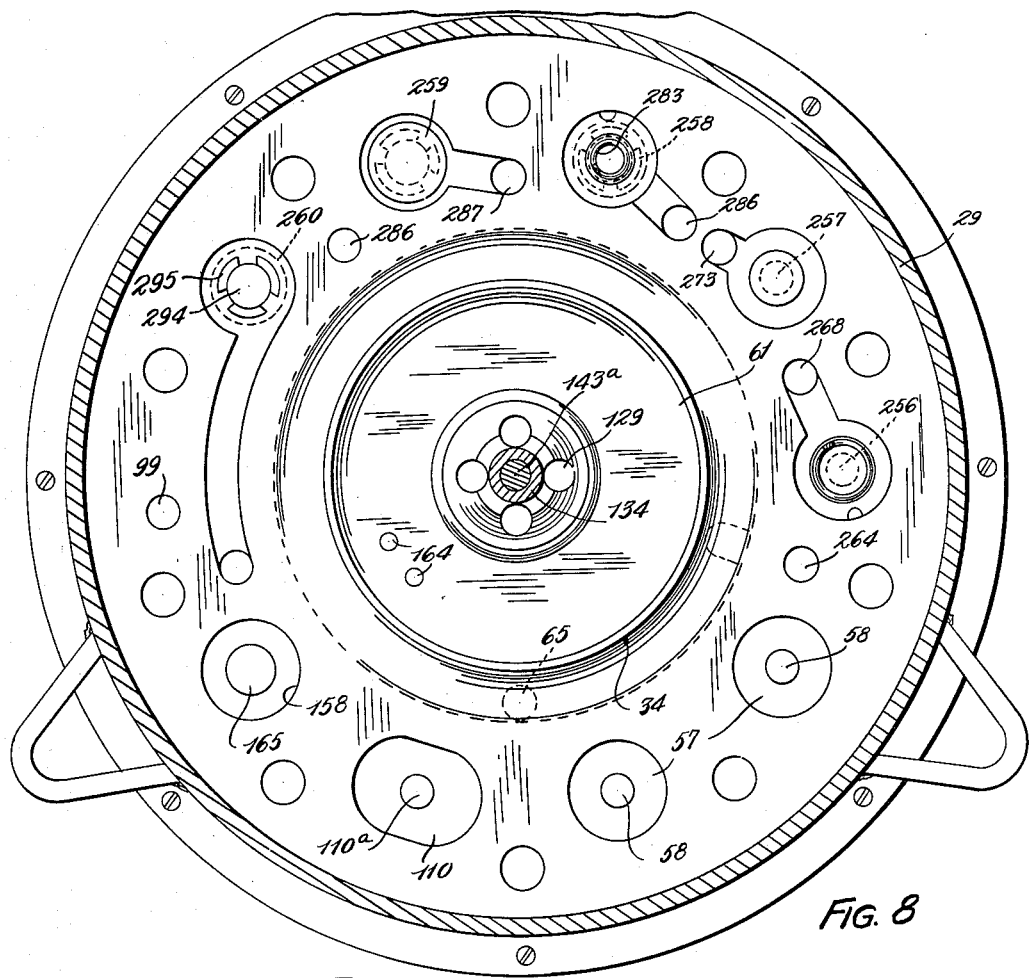
Fig. 8 is a transverse section taken through the control valve mechanism at the location indicated by section line 8—8 of Fig. 2.

The valve devices embodied in the control valve mechanism 14 include a third stage emergency valve 256 and an emergency limiting valve 257 (see Figs. 2 and 3) and also include an auxiliary reservoir quick charging valve 258, an auxiliary reservoir check valve 259 and a supply reservoir charging valve 260 (see Figs. 2 and 5). The valves just mentioned are all located on the carrier 42 in arcuately spaced relation to each other so that these valves constitute an annular row surrounding the emergency piston chamber 59. When these valves are disposed in this location an extremely compact arrangement and construction is provided, as shown in Fig. 8 of the drawings.

The third stage emergency or equalizing valve 256 is formed, in part, by the portion 261 of the diaphragm 62 on which this valve member is mounted. This third stage emergency valve is located in a chamber 262 formed by portions of the carrier 42, the adapter 45 and the body 46 and which chamber is divided into compartments 262a and 262b by the diaphragm portion 261. The compartment 262a is connected with a chamber 263 of the intermediate housing section 28 by means of the passage 264 and the chamber 263 is, in turn, connected with the supply reservoir 15 by the passages 265 and 212 and the pipe 23. A valve seat 256a is formed on or supported by the carrier 42 so as to be located in the compartment 262a in surrounding relation to the passage 264 and the valve member 256 is normally held in engagement with this seat by a spring 266 located in the compartment 262b. The pressure of the spring 266 is applied to the valve member 256 through the diaphragm portion 261 and through a cup-shaped spring seat 267 which is slidable in the compartment 262b. The compartment 262b is continuously connected with the compartment 63 of the emergency piston chamber 59 by the passage 268. A passage 269 communicates with the compartment 262a and extends therefrom to the emergency limiting valve 257.

The emergency limiting valve device 257 includes a valve member 257a (see Fig. 3) carried by a diaphragm portion 270 and located in a valve chamber 271 formed in the carrier 42. The valve member 257a cooperates with a valve seat 272 surrounding the passage 269. The diaphragm portion 270 extends across the valve chamber 271 and divides the same into compartments 271a and 271b. The compartment 271a is in open communication with a passage 273 by which it is connected directly with the passage 99 and with the compartment 167 of the quick-service vent valve means. The compartment 271b is in direct communication with the vent chamber 110.

The emergency limiting valve device 257 also includes a plunger or actuating stem 257b which is slidable in the body 46 and has its inner end in engagement with the diaphragm portion 270. The outer end of the stem 257b extends into a chamber 274 formed between portions of the body 46 and the cover 47 and carries a head 275. The chamber 274 is divided into compartments 274a and 274b by a portion 276 of the diaphragm 52. The head 275 and a compression spring 275a acting thereon are located in the compartment 274a and this spring holds the stem 257b in a retracted position so that the valve member 257a is normally in an open position. The compartment 274b is connected with the application chamber supply passage 99 by the passage 277 such that the diaphragm portion 276 is acted upon by application chamber pressure tending to close the valve member 257a. The spring 275a is of such stiffness, however, that it will hold the stem 257b in its retracted position against the normal pressure of the application chamber but when the application chamber pressure is increased by the admission of supply reservoir pressure thereto during an emergency application, this spring will be flexed and the stem 257b will be moved inwardly to close, or partially close, the valve member 257a. The character of the spring 275a is preferably such that when the application chamber pressure reaches a predetermined maximum value the valve member 257a will be moved to its closed position.

Charging

The auxiliary reservoir quick charging valve 258 is located in a valve chamber 278 of the carrier 42 and is engageable with a valve seat 279 formed or mounted on the carrier. The valve seat 279 extends around a passage 280 which connects the valve chamber 278 with a diaphragm chamber 281. A diaphragm portion 282 extends across the chamber 281 and divides the same into compartments 281a and 281b. The valve 258 has a stem 258a which is slidable in the carrier 42 and extends into the compartment 281a to be engaged by the diaphragm portion 282. A spring 283 located in the compartment 281b acts on the diaphragm portion 282 through a spring seat 284 and holds the valve 258 open whenever the pressure in the auxiliary reservoir is at a value below approximately fifty pounds per square inch. A spring 285 located in the compartment 281a acts on the valve stem 258a to draw the valve 258 toward engagement with the valve seat 279 but is a relatively light spring so as not to prevent the valve from being held open by the spring 283 when the pressure of the auxiliary reservoir is below the value mentioned above. The compartment 281b is at all times vented to atmosphere inasmuch as it is connected with the vent chamber 110 by the passage 281c.

The valve chamber 278 of the auxiliary reservoir quick charging valve is connected with the brake pipe chamber 57 by a passage 286 so that while the valve 258 is held open by the spring 283, fluid pressure from the brake pipe 13 will flow through the passage 286 to the chamber 278 and then through the passage 280 into the compartment 281a. From the compartment 281a the fluid pressure flows through a passage 287 into a chamber 288 of the carrier 42 and then past the auxiliary reservoir check valve 259 into the auxiliary reservoir 31. The fluid pressure being supplied to the auxiliary reservoir through the compartment 281a acts on the diaphragm portion 282 and when the pressure of the fluid in the auxiliary reservoir increases to approximately the fifty pounds per square inch value mentioned above, the spring 283 will be compressed to thereby permit the spring 285 to close the valve 258.

The fluid being supplied to the auxiliary reservoir 31 past the quick charging valve 258 flows into the auxiliary reservoir from the chamber 288 through the passage 289. This passage is controlled by the check valve 259 which cooperates with a valve seat 290 provided on the carrier 42 and surrounding the passage 289. The check valve 259 has a stem 259a which is slidable in the carrier 42 and extends into the chamber 288. A spring 291 located in the chamber 288 acts on the stem 259a to normally hold the check valve 259 in a closed position in engagement with the seat 290. The check valve 259 is readily opened by the pressure fluid flowing into the auxiliary reservoir past the quick charging valve 258 but when the auxiliary reservoir pressure reaches the fifty pounds per square inch value mentioned above and the quick charging valve 258 is closed, the check valve thereafter remains seated and prevents a backflow of pressure fluid out of the auxiliary reservoir through the passage 289.

The supply reservoir 15 is charged with pressure fluid which is supplied thereto from the brake pipe through the auxiliary reservoir 31. For this purpose a valve chamber 292 (see Fig. 5) which is adapted to be connected with the auxiliary reservoir is in open communication with the supply reservoir 15 through a passage 293, the chamber 263, the passages 265 and 212 and the pipe 23. The connection of the chamber 292 with the auxiliary reservoir 31 is controlled by the outwardly opening supply reservoir charging valve 260. The valve 260 is located in the valve chamber 292 and cooperates with a valve seat 294 formed or mounted on the carrier 42 and extending around the passage 295. The valve 260 has a stem 260a which extends through and is slidable in the carrier 42. Whenever the pressure in the auxiliary reservoir 31 falls below that to which the supply reservoir 15 has been charged, the valve 260 will be closed by the supply reservoir pressure and by the action of a light spring 260b and will prevent a return flow of fluid out of the supply reservoir.

Load responsive mechanism

The improved air brake apparatus herein disclosed is automatically responsive to changes in the load of the railway car 10 so that the braking force developed by the brake will be substantially in proportion to the load carried by the car. The amount of the braking force developed by the brake is dependent upon the pressure of the fluid supplied to the brake cylinder 16 and this can be varied by adjustment of the relay valve mechanism 35. The adjustment of the relay valve mechanism is accomplished by shifting the fulcrum pin 210 which is carried by a fulcrum pin bracket 211 so as to vary the effective lever arm values of the arms 209a and 209b of the rocking lever 209. Such shifting of the fulcrum pin 210 is effected automatically by a hydraulic pressure responsive device 212 embodied in the load responsive means 213 which will be described next.

The fulcrum pin bracket 211 is carried by a cup-shaped plunger 296 which is shiftable in response to variations in hydraulic pressure occurring in the working chamber 297 of a hydraulic cylinder or bulb 298. The cylinder 298 is suitably mounted on the intermediate housing section 28 and is located in the fulcrum chamber 38 thereof. The cylinder 298 is formed, in part, by a metal shell 299 and, in part, by a flexible wall 300 formed of rubber or other suitable flexible material. The flexible wall 300 can be connected with the metal shell 299 by having an edge bead 301 locked in an annular channel 302.

The plunger 296 is provided with a stem 303 which is slidable in a guide sleeve 304. If desired, the stem 303 may have spaced bushings 305 connected therewith for mounting this stem in the guide sleeve. The plunger 296 is maintained in coaxial alignment with the cylinder 298 by the cooperation of the stem 303 with the guide sleeve 304, and the plunger is held in seating engagement with the flexible wall 300 by means of a spring 306 which is disposed around the guide sleeve. The plunger 296 is held against arcuate shifting about the axis of the stem 303 by means of a fixed pin 307 mounted on the housing section 28 and extending into an axial slot 308 of the plunger.

The guide sleeve 304 extends into the fulcrum chamber 38 through an opening 309 of the housing section 28. The guide sleeve is carried by a cover 310 which is adapted to be bolted or otherwise suitably connected with the housing section 28 in overlying relation to the opening 309. A collar 311 forms a seat for the outer end of the spring 306 and is slidable on the guide sleeve 304. The tension of the spring 306 can be adjusted by shifting the collar 311 along the guide sleeve 304. This adjustment of the collar along the guide sleeve can be accomplished by providing the collar with a pair of pins 312 which extend through slots 313 of the sleeve and are engaged by an adjusting nut 314. The nut 314 engages an internal thread 315 of the guide sleeve and is provided with a wrench socket 316 to which a suitable adjusting tool can be applied for screwing the nut inwardly or outwardly of the guide sleeve. Access to the adjusting nut 314 is had through an opening 317 of the cover 310 and which opening is normally closed by a removable plug 318. The plug 318 has a wrench socket 318a therein of the same size and shape as the wrench socket 316 so that this plug can be loosened or tightened by the same tool as is used on the nut 314.

The load setting for the relay valve mechanism 35 is determined by the position to which the plunger 296 is moved and this, in turn, depends upon the volume of hydraulic pressure fluid which is forced into the chamber 297 through the pipe 27 in opposition to the spring 306. The hydraulic pressure fluid supplied to the chamber 297 is delivered thereto from the hydraulic cylinder devices 25 and 26 which are of the expansible chamber or bellows type and are located at opposite sides of the truck 10. These hydraulic cylinder devices are mounted on a sprung part of the car, such as the bolster 12, and engage unsprung portions of the car, such as the side frames 11, so that the relative movement which takes place between the sprung and unsprung portions due to changes in the loading of the car will cause variable amounts of the hydraulic pressure fluid to be delivered by the devices 25 and 26 to the chamber 297 of the hydraulic cylinder 298. By providing two of the generating devices 25 and 26 and locating the same at opposite sides of the truck of the car 10, the effects of lateral rocking of the car body on its supporting trucks on the amount of hydraulic pressure fluid being supplied to the cylinder 298 will be eliminated.

When the load of the car 10 is increased the devices 25 and 26 will be further contracted and will cause an increased amount of the hydraulic pressure fluid to be transmitted to the chamber 297 of the pressure responsive device 212 to alter the setting of the relay valve mechanism 35 by moving the fulcrum pin 210 upwardly as seen in Fig. 4. When the load of the car is decreased, the cylinder devices 25 and 26 will be permitted to expand and a corresponding amount of hydraulic pressure fluid will be transmitted thereto from the chamber 297 and this will permit the spring 306 to alter the setting of the relay valve mechanism 35 by moving the plunger 296 and the fulcrum pin 210 downwardly.

When the fulcrum pin 210 is moved upwardly in response to a car load increase, the lever arm 209a is thereby lengthened and the lever arm 209b is correspondingly shortened. During an application of the brake the pressure fluid supplied to compartment 179a of the relay valve means 35 acts through the fulcrumed lever 209, as explained above, to cause the valve 194 to be opened for supply reservoir fluid to be supplied to the brake cylinder. At this time pressure of the supply reservoir fluid builds up in the compartment 180a and shifts the piston 185 to permit the valve 194 to reclose, as also explained above. When the lever arm 209b has been shortened by an increase in the car load, a greater pressure will need to build up in the compartment 180a to shift the piston 185 against the pressure acting in the compartment 179a to permit reclosing of the valve 194, and such greater pressure will also act in the brake cylinder to cause a stronger braking force to be developed.

The conduit which transmits the hydraulic pressure from the generating device 25 to the pressure responsive device 212 includes the previously mentioned pipe 27 and the branch pipes 25a and 26a. The pipe 27 is detachably connected with the control valve mechanism 14 by means of the connection 320 for facilitating inspection and repair operations on the apparatus. Similar detachable connections are provided between the branch pipes 25a, 26a and the hydraulic pressure generating devices 25, 26. In order to prevent the escape of the hydraulic fluid from the pipes and the pressure devices when the pipes are disconnected, these pipes are provided with valved fittings which form these detachable connections.

As shown in Fig. 13, the setting of the load responsive mechanism 213 of any car of the train can be quickly and easily checked or determined by a crewman by a simple gauging operation. In doing this the plug 318 is unscrewed to afford access to the passage of the guide sleeve 304 and a gauge member 321 of the "measuring stick" type is inserted. The gauge has appropriate graduations 321a thereon and when its inner end engages the piston stem 303 a portion of the gauge will remain in outwardly projecting relation from the guide sleeve 304 to indicate the setting of the load responsive mechanism.

*Detailed operation*

The operation of this improved air brake apparatus has already been partially explained in the foregoing description but a more complete explanation of the operation of the apparatus will now be given. When the control valve mechanism 14 is in the condition corresponding with the release and normal charging position illustrated in Figs. 2, 3, 5 and 6 of the drawings, the auxiliary reservoir 31 is being charged from the brake pipe 13 through the passage 58, brake pipe chamber 57, compartment 54 of the service piston chamber 49, through the passage 67a, valve chamber 74 and past the charging valve 84 which is then in its open position, through the axial passage 79, the radial ports 95 and past the elastic check valve member 98 into the auxiliary reservoir. If the condition of the air brake apparatus happens to be one in which the auxiliary reservoir 31 is empty, the charging of this reservoir will initially take place as a quick charging operation during which air will be rapidly supplied to this reservoir (see Fig. 5) from the brake pipe chamber 57 through the passage 286, past the quick charging valve 258 which is then being held in its open position by the spring 283, through the passage 280, compartment 281a of the chamber 281, passage 287, valve chamber 288, passage 289 and past the check valve 259 into the auxiliary reservoir.

When the quick charging operation progresses to the point where the pressure in the auxiliary reservoir has built up to a value of approximately 50 pounds per square inch this pressure acting on the diaphragm portion 282 of the chamber 281 will assist the spring 285 and cause closing of the quick charging valve 258. Therefore the charging of the auxiliary reservoir will ordinarily take place through the valve chamber 74 of the service piston 33, through the ports 95, and past the check valve 98, as just explained above. When the charging of the auxiliary reservoir through the ports 95 has resulted in the pressure being built up to the pressure of the brake pipe, the check valve 98 will remain closed and equalization of the auxiliary reservoir pressure with brake pipe pressure, as fluctuations occur in the latter, will take place through the continuously open restricted port 96.

While the auxiliary reservoir 31 is being charged, the supply reservoir 15 and the emergency and release control chamber 40 are also being charged and by the time that the auxiliary reservoir is fully charged the supply reservoir and the emergency and release control chamber will also be fully charged. The supply reservoir 15 is charged from the auxiliary reservoir 31 by the flow of air from the latter through the passage 295, past the check valve 260, through passage 293, chamber 263, and through passage 65 and pipe 23 into the supply reservoir.

The emergency and release control chamber 40 is charged from the supply reservoir 15 while the valve 140 (see Figs. 3 and 7) is being held open by the hollow stem 133 of the emergency piston 34 which has been shifted to the right by the increasing brake pipe pressure. The flow of air for this purpose is traced from the supply reservoir 15 through pipe 23, passages 212 and 265 into chamber 263, then past valve 140 and around the outside of the emergency piston stem 133, through the counterbore 173 and grooves 172 which are then in overlapping relation, into the compartment 63 of the emergency piston chamber 59 and through passage 65 into the emergency and release control chamber 40.

When a service application of the brake is made, the engineer's brake valve is actuated to vent pressure from the brake pipe 13 and the resulting pressure drop is transmitted to the control valve mechanism 14 of each car of the train and results in a decrease in pressure in the compartment 54 of the service piston chamber 49 and in a similar decrease of pressure in the compartment 64 of the emergency piston chamber 59. A pressure differential is thereby created between the compartment 64 and the compartment 63 with which the control chamber 40 is in direct communication. This pressure differential moves the emergency piston 34 toward the left, as seen in Figs. 2, 3 and 7, causing the piston member 61 to engage the push pins 164 of the quick-service vent valve 155. This movement of the emergency piston continues for a distance sufficient to shift the pins 164 and open the quick-service vent valve 155 but not far enough to cause the piston stem 134 to open the emergency vent valve 147.

The opening of the quick-service vent valve 155 on each car of the train by the emergency piston 34, in the manner just explained, causes brake pipe pressure to be vented locally to atmosphere at each car through the passages 157 and 157a, past the second quick-service vent valve 165, through the passage 159 and into the vent chamber 110 which leads to atmosphere through the exhaust chamber 39 and the exhaust passage 39a. The venting of pressure from the brake pipe to atmosphere in this manner at each of the control valve mechanisms of the train, quickly reduces the brake pipe pressure for producing a service application of the brakes and eliminates the time delay which would be involved if all of the air had to be vented through the engineer's brake valve. The quick-service vent valve 155 remains open during the service application of the brake, but as soon as pressure fluid is supplied to the application chamber 32 and the relay valve means 35 through the passage 99 by reason of the functioning of the service piston 33, as will be presently explained, such pressure fluid enters the valve chamber 166 and closes the quick-service vent valve 165.

The initial venting of brake pipe pressure through the engineer's brake valve and through the quick-service venting means, just explained above, results in a pressure differential on the service piston 33 in which the auxiliary reservoir pressure existing in the compartment 53 predominates over the pressure in the compartment 54 and causes the service piston to be moved toward the right, as seen in Figs. 2, 3 and 6. The above described movements of the service and emergency pistons 33 and 34 result in these pistons assuming the quick-service position in which the quick-service venting valves 155 and 165 are in their open position.

During the movement of the service piston 33 to the quick-service position, the valve 84 will be engaged by the valve seat 85, after which this valve will be moved with the piston, causing further compression of the spring 87. During this movement of the service piston, the hollow piston stem 78 will be moved in a direction away from the valve seat 101, but the application chamber inlet valve 100 will be maintained in its closed position in engagement with the seat 101 by the spring 89.

When a service reduction has been made and the functioning of the apparatus has progressed beyond the quick-service position to the point where a service application of the brake has actually taken place, the service piston 33 will have been moved toward the right a sufficient distance to cause the lost motion to be fully taken up between the hollow piston stem 78 and the head 88a of the plunger 88 carrying the application chamber inlet valve 100. The valve 100 will thus be moved away from its seat 101, thereby permitting air from the auxiliary reservoir 31 to be supplied to the relay valve mechanism 35 and to the application chamber. The extent to which the valve 100 can be opened during a service application will be limited by the pre-loaded spring 91 which acts as a stop at this time.

The flow of air from the auxiliary reservoir 31 to the relay valve mechanism 35 and the application chamber 32 takes place through the valve port 104, the chamber 103, the bent tube 105 and passage 99 to the compartment 182a of the valve chamber 182. From the valve chamber 182 some of the pressure being supplied is delivered to the compartment 179a of the piston chamber 179 of the relay valve mechanism 35 through the passage 217. At this time the valve 176 is in its open position, as shown in Fig. 5, and the compartment 182b, with which the passage 217 is connected, is in open communication with the compartment 182a. Some of the pressure being supplied to the valve chamber 182 is also delivered to the application chamber 32 by flowing through the restricted passage provided by the clearance space or tolerance existing between the stem 226 and the bore 220, through the groove 227 and the passage 219 into the application chamber.

The fluid pressure supplied to the compartment 179a of the piston chamber 179 has acted on the piston 184 and has shifted the same toward the left and has thereby rocked the lever 209 on the fulcrum pin 210. The rocking of this lever has transmitted motion to the piston 185 and has shifted the latter toward the right in opposition to the spring 207. This movement of the piston 185 has caused the brake cylinder exhaust valve 199 to engage the annular valve seat 193 to close the exhaust passage 214. Movement of the piston 185 has continued after the seating of the valve 199 on the valve seat 193, causing the stem 206 to engage and open the brake cylinder inlet valve 194. The opening of the valve 194 has permitted pressure to be supplied to the brake cylinder 16 from the supply reservoir 15 to actuate the brake cylinder and cause a service application of the brake.

The path of travel of the pressure fluid thus supplied to the brake cylinder 16 is traced from the supply reservoir 15 through the pipe 23 to the control valve mechanism 14 and through the passages 212, 213a and 213b thereof to the valve chamber 190, then past the brake cylinder inlet valve 194 through the passage 191 to the compartment 180a of the piston chamber 180 and then through passage 216 and pipe 24 to the brake cylinder. The fluid being thus supplied to the brake cylinder through the compartment 180a also acts on the piston 185 and balances the pressure acting on the piston 184. As long as the service piston 33 remains in the service position, the application chamber inlet valve 100 will be in open position and the relay valve mechanism 35 will be maintained in the position in which the brake cylinder vent valve 199 is closed and the brake cylinder supply valve 194 is open, and during this time the brake cylinder 16 will hold the brake in its applied position. During the time that the brake is thus maintained in the applied position, the cam shoulder 123 will be disengaged from the bellcrank lever 120 and the valve member 114 of the application chamber vent valve device 111 will be maintained in its closed position by the spring 117.

During the functioning of the control valve mechanism 14 to produce the above described service application of the brake, the emergency piston 34 is moved to the left by the pressure of the control chamber 40 acting thereon through the compartment 63, as explained above. This movement of the emergency piston 34 is desirable for actuating the quick-service vent valve 155, but movement of the emergency piston at this time through a sufficient distance to unseat the emergency vent valve 147 would be undesirable because it would result in an undesired emergency application of the brakes. To prevent such opening of the emergency vent valve 147 when only a service application of the brake is desired, the pressure in the control chamber 40 is dissipated as soon as it has produced the desired initial movement of the emergency piston. This is accomplished by venting of the pressure from the control chamber 40 and the compartment 63 through the overlapping grooves 172 and counterbore 173, through the passage 135 and past the check valve 143 into the chamber 127 of the emergency piston, and then through the openings 129, the compartment 64 and the passage 66 into the brake pipe chamber 57.

During the service application described above, the charging of the application chamber 32 from the auxiliary reservoir 31 by the opening of the valve 100 causes a drop in the auxiliary reservoir pressure and this creates a pressure differential between the brake pipe and the auxiliary reservoir which results in a return movement of the service piston 33, as previously explained herein, for reclosing the valve 100. At or near the end of the service application, the action of supply reservoir fluid on the piston 185 in balancing the pressure fluid acting on the piston 184 permits the spring 195 to reclose the valve 194 to discontinue the supply of pressure fluid to the brake cylinder. The movement of the piston 185 during this balancing action is sufficient to permit closing of the valve 194 but insufficient to unseat the brake cylinder exhaust valve 199 and, hence, the pressure fluid previously supplied to the brake cylinder will be retained therein for holding the brake in its applied state. The apparatus is now in the service lap position. If leakage of pressure fluid from the brake cylinder should occur, the pressure in the compartment 180a will decrease and this will permit the pressure in the compartment 179a to predominate and shift the piston 185 in a direction to reopen the valve 194 and cause additional pressure fluid to be supplied to the brake cylinder to compensate for the leakage.

When the brake is to be released following a service application thereof, the engineer manipulates his brake valve to the position in which pressure is delivered into the brake pipe 13 and through the brake pipe chamber 57 into the compartment 54 of the service piston chamber and the compartment 64 of the emergency piston chamber. The pressure thus supplied to the compartment 64 moves the emergency piston 34 toward the right to the position shown in Fig. 3, causing the end of the hollow piston stem 133 to engage and open the valve 140. The opening of this valve permits fluid pressure from the supply reservoir 15 to flow through the passage 135 past the check valve 143 and through the compartment 64 and the passage 66 into the brake pipe chamber 57.

Since at this time the supply reservoir pressure is of a value above the brake pipe pressure, this return of pressure fluid to the brake pipe will cause the service piston 33 to be quickly shifted toward the left. This movement of the service piston causes the cam shoulder 123 to rock the bellcrank lever 120 in a clockwise direction, thereby actuating the plungers 119 and 118 and opening the valve member 114 of the vent valve device 111 in opposition to the spring 117. The opening of the valve member 114 permits pressure fluid to be vented from the application chamber 32 and the relay valve mechanism 35 to atmosphere to bring about the venting of pressure fluid from the brake cylinder 16. The movement of the service piston toward the left also opens the valve 84 to permit recharging of the auxiliary reservoir 31. In certain types of control valve mechanisms in which a slide valve is actuated by the service piston, the occurrence of wear on the service piston often permits leakage of pressure fluid past this piston at the time of releasing the brake, such that the auxiliary reservoir is recharged too early to permit an effective pressure differential to act on the service piston. Under these circumstances, the service piston may fail to move to release position, particularly when the presence of dirt or corrosion has rendered the actuation of the slide valve more difficult, and the resulting condition is that which is commonly referred to as a "stuck brake."

The air brake mechanism herein disclosed is not subject to the occurrence of this condition of stuck brakes because the auxiliary reservoir charging valve 84 temporarily remains closed so as to prevent recharging of the auxiliary reservoir 31 until the service piston 33 moves to release position and during which movement it causes opening of the application chamber vent valve device 111 through rocking of the lever 120. Since the auxiliary reservoir pressure is usually low just prior to release actuation, a strong pressure differential between auxiliary reservoir pressure and brake pipe pressure will be effective on the service piston 33 as soon as the release of the brake is called for by the engineer in producing an increase in brake pipe pressure.

Opening of the valve 140 by the release movement of the emergency piston 34 permits supply reservoir pressure to be admitted to the brake pipe. This admission of supply reservoir pressure to the brake pipe is not needed so far as the release actuation of applicant's brake mechanism is concerned, but is useful as a "neighborly" function for the assistance of adjacent brake mechanisms. Thus, if the adjacent brake mechanisms are of a slide valve type subject to becoming stuck as explained above, this increase in brake pipe pressure by the admission of supply reservoir fluid will assist such adjacent brake mechanisms in going to release position.

The venting of pressure fluid from the relay valve mechanism 35 takes place from the compartment 179a of the piston chamber 179 through the passage 217, the compartments 182b and 182a of the valve chamber 182 through the passage 99, and then through the passage 109 and the vent valve device 111 to the vent chamber 110. At this time pressure fluid is also vented from the application chamber 32 through the passage 219, the groove 227 and the restricted clearance space surrounding the stem 226, into the compartment 182a of the valve chamber 182. From the valve chamber 182 the fluid pressure being vented follows the same path as that just traced above for the venting of the relay valve mechanism 35. When pressure is vented from the compartment 179a, the spring 207 and brake cylinder pressure in compartment 180a causes the piston 185 to be shifted toward the left as seen in Fig. 4. This movement of the piston 185 shifts the brake cylinder exhaust valve 199 away from the seat 193, thereby uncovering the exhaust passage 214 to permit pressure fluid to be exhausted from the brake cylinder through the pipe 24, the passage 216, the compartment 180a, the passage 215, the pipe 22 and the retaining valve 21.

The force with which the brakes are applied during a service application will depend upon the extent of movement imparted to the pistons 184 and 185 of the relay valve mechanism 14 and this, in turn, is dependent on the pressure value of the service reduction made by the engineer. The braking force developed during both service and emergency applications of the brake will depend on the lever arm values of the arm portions 209a and 209b of the lever 209 and this depends on the position occupied by the fulcrum pin 210. The position of the fulcrum pin 210 is dependent upon the amount of load carried by the car and this pin is automatically shifted, as pointed out above, by the piston 298 in response to variations in the load.

When an emergency application of the brakes is needed, the engineer moves his brake valve accordingly to cause an emergency reduction of brake pipe pressure which is immediately transmitted to the service and emergency piston chambers 49 and 59 of the control valve mechanism. The resulting emergency pressure differential acting on the emergency piston 34 produces a quick movement of this piston toward the left, causing the piston stem 134 to engage and open the emergency vent valve 147. The opening of the emergency vent valve permits brake pipe pressure to be quickly vented to the atmosphere through the chamber 110, the exhaust chamber 39, and then through the exhaust passage 39a past the insect guard 41.

The emergency pressure differential acting on the service piston 33 also causes a quick movement of this piston toward the right which opens the application chamber inlet valve 100 to permit pressure fluid to be supplied to the relay valve mechanism 35 and the application chamber 32. At this time the service piston will have moved a sufficient distance such that the spring 87 will have been compressed and the inlet valve 100 will have been moved to an open position in which the stem 107 extends through the valve port 104 but the restricting element 108 still remains in the chamber 103. The condition of the relay valve mechanism 14 is now that which can be conveniently referred to as the initial portion of the first stage emergency condition.

The pressure fluid which is supplied to the application chamber 32 and to the relay valve mechanism 35 during this first stage emergency condition actuates the relay valve to cause the brake cylinder supply valve 194 to be opened to supply pressure fluid to the brake cylinder 16 from the supply reservoir 15 in the same manner as has been described above during a service application of the brake but, since the movement of the service piston during an emergency reduction is substantially greater than during a service reduction, the application chamber inlet valve 100 will be opened to a greater extent and the brake will be applied with a greater rapidity than during a service application. The emergency functioning just described above results in a quick limited build-up of emergency pressure in the relay valve mechanism, and consequently in the brake cylinder 16, as the first of two successive pressure stages.

The sudden venting of the brake pipe which occurs upon the opening of the emergency vent valve 147, as explained above, results in the service and emergency pistons being quickly moved to their extreme emergency positions corresponding with the final portion of the first stage emergency condition of the control valve mechanism. In this latter condition the emergency vent valve 147 is in its fully open position. The movement of the service piston to its extreme emergency position causes the pre-loaded spring 91 to be compressed and also causes the plunger 88 to be shifted so as to move the restricting element 108 into the valve port 104. The area of the port 104 has now be restricted so as to reduce the rate of pressure build-up for the fluid being supplied to the relay valve mechanism and consequently for the fluid being supplied to the brake cylinder. This reduced rate of pressure build-up corresponds with the above-mentioned final portion of the first emergency pressure stage and, although it produces an increase in the braking force being developed by the emergency functioning of the apparatus, it will be a more gradual increase than that which occurs during the initial portion of this first emergency pressure stage.

With respect to these initial and final portions of the first stage emergency condition, it should be explained further that the initial movement of the service piston 33 toward the right in response to an emergency brake pipe pressure reduction will be a rapid movement causing a quick opening of the passage 104 to its full extent. This quick full opening of the passage 104 permits a rapid transfer of auxiliary reservoir pressure to the application chamber 32 and to the chamber 179 of the relay valve means 35 to quickly bring about the main portion of the emergency brake application. However, if this rapid rate of emergency pressure build-up were permitted to continue right up to the point of actuation corresponding with a full emergency application of the brakes, the brakes would be applied with such force and suddenness as to produce a hazardous condition.

This initial rapid movement of the service piston 33 toward the right is sufficient to cause the desired full opening of the passage 104, but by the time this has taken place, the compression resistance of the springs 87 and 91 will have built up to an extent to cause a slowing down of the movement of the piston 33 as the restricting element 108 is brought into restricting relation to the passage 104. This restricting of the passage 104 by the element 108 thus causes a decrease in the rate with which the succeeding portion of the emergency application is being carried out such as to prevent the occurrence of the hazardous condition just above mentioned. The final portion of the first stage emergency condition is thus a continuation of the initial portion of the first stage but is that subsequent portion of the emergency functioning in which the rate of emergency pressure built up has been decreased in the manner just above explained.

During an emergency application of the brake the above-described desired quick actuation of the emergency piston 34 to cause opening of the emergency vent valve 147 is obtained by the action of the pressure of the control chamber 40 and this functioning needs to be further described at this point, particularly with regard to the grooves 172 and the counterbore 173. The grooves 172 and counterbore 173 cooperate in forming a time delay means which causes the emergency vent valve 147 to be maintained in an open position. The length of the grooves 172 is such that they normally overlap the counterbore 173 to form the above-mentioned escape passage through which the pressure in the control chamber 40 can escape during service applications of the brake. When an emergency reduction is made, the grooves 172 do not vent the control chamber 40 quickly enough to prevent the control chamber pressure from being effective on the emergency piston, and hence, this piston is moved suddenly to the left to take up the lost motion between the piston stem 134 and then open the emergency vent valve 147.

By the time that the emergency vent valve begins to open, the grooves 172 will move out of communication with the counterbore 173, thereby closing the escape passage from the control chamber 40. By reason of the closing of this escape passage the pressure of the control chamber 40 will continue to act on the emergency piston and will be effective in holding this piston in its shifted position for retaining the emergency vent valve 147 open. During the initial portion of the emergency movement of the piston 34 and prior thereto, the pressure of the control chamber 40 is also acting on the diaphragm portion 261 of the chamber 262 (see Fig. 3) to hold the equalizing valve 256 in its closed position in engagement with the seat 256a. For this purpose the pressure of the control chamber 40 is transmitted to the compartment 262b of the chamber 262 through the passage 65, the compartment 63 of the emergency piston chamber 59, and the passage 268.

When the emergency piston 34 has been moved to the position for opening the emergency vent valve 147 and for holding this valve open for the desired period of time, as explained above, the pressure of the control chamber 40 has served its purpose and it is then desirable to permit the emergency vent valve to reclose and to have the equalizing valve 256 open to cause pressure from the supply reservoir 15 to be delivered into the application chamber 32 and the auxiliary reservoir 31 to create a second emergency pressure stage for further increasing the force with which the brake is being applied. To permit these subsequent events to take place, the pressure of the control chamber 40 is dissipated through the leakage passage formed by the clearance space or tolerance surrounding the piston stem 133 and flows into the passage 135 and past the check valve 143 into the brake pipe chamber 57 which is then in a substantially exhausted condition. This release of pressure from the control chamber 40 reduces the pressure in the compartment 262b thus permitting the equalizing valve 256 to be opened by the pressure of the supply reservoir thereon and by application chamber pressure in the valve chamber 262a acting on the diaphragm portion 261 and this valve will then be maintained open by the pressure of the supply reservoir acting on the diaphragm portion 261.

When the control valve mechanism assumes its second stage emergency position, the above-mentioned second emergency pressure stage will be created by discharging supply reservoir pressure past the valve 256 into the application chamber and auxiliary reservoir so as to substantially equalize the pressures of these reservoirs and bring about the development of a maximum emergency braking force by the brake cylinder 16. From the valve chamber 262a this pressure fluid from the supply reservoir 15 flows through the passage 269 and past the emergency pressure limiting valve 257, which is normally open, into the valve chamber 271 and then through portions of the passage 273 into the passage 99. The portion of this supply reservoir fluid which flows to the auxiliary reservoir travels through the passage 99, the tube 105 valve chamber 103 and past valve member 100 into the auxiliary reservoir. Another portion of this supply reservoir fluid flows through the passage 99 to the relay valve mechanism 35 and the application chamber 32 and influences the relay valve mechanism to cause a further pressure build-up in the brake cylinder 16 which results in an emergency braking force of the desired maximum value being developed. Still another portion of the supply reservoir fluid enters the chamber 167 and acts on the diaphragm portion 166 to maintain the quick-service vent valve 165 closed.

To prevent the emergency braking force developed by the brake cylinder from exceeding the desired maximum value it is necessary to control the supply reservoir pressure being delivered to the relay valve mechanism 35 and this is accomplished at this time by the emergency pressure limiting valve 257. While supply reservoir fluid is being delivered to the relay valve mechanism, some of this fluid is also being delivered to the compartment 274b of the chamber 274 through the passage 277 and when the desired application chamber pressure has built up, it acts on the diaphragm portion 276 and causes the plunger 257b to close the emergency pressure limiting valve 257. The closing of the valve 257 prevents the supply reservoir fluid from causing a further increase in application chamber pressure and thus prevents the brake cylinder pressure from reaching an excessive value.

During the release of the brake following an emergency application the same functioning occurs, as has been explained above in connection with the release following a service application. If it is desired to release the brakes of one or more cars manually following an emergency application, this can be accomplished by venting the brake cylinders only by manipulation of the actuating member 241 of such cars by a member of the train crew. By actuation of this member the valve 176 is moved into engagement with the seat 218 and the valve 225 is disengaged from the seat 222. The opening of the valve 225 vents the compartment 179a of the relay valve mechanism 35 directly to atmosphere to permit the spring 207 to impart return movement to the piston 185 and open the brake cylinder vent valve 199. When the valve 176 is thus engaged against the seat 218, the pressure of the application chamber 32 acts on this valve to hold the same seated, and hence, the crewman need not hold the member 241 in its actuated position but can pass on to other cars of the train immediately.

The closed condition of the valve 176 prevents the pressure of the application chamber 32 from being vented to the atmosphere through the passage 221 and at this time the desired pressure in the application chamber is maintained by the auxiliary reservoir. When the compartment 179a is vented to the atmosphere in this manner following an emergency application of the brakes, the pressure of the supply reservoir 15 is conserved since the venting of this reservoir is not necessary. In actuating the valves 176 and 225 manually by means of the member 241, the crewman imparts to the lever 228 only sufficient movement to shift these valves and insufficient to cause opening of the supply reservoir vent valve 175. Whenever it is desirable to empty the supply reservoir 15 however, such as during repair work, the crewman actuates the control member 241 beyond the position for shifting the valve 176 and 225, thereby opening the supply reservoir vent valve 175.

*Modified constructions*

Fig. 14 of the drawings shows a modified construction for the control valve mechanism 14 in which the emergency piston 34 is relieved, or substantially relieved, from the pressure of the brake pipe chamber 57 so that the pressure of the control chamber 40 will be more effective in the compartment 59 for shifting the emergency piston to cause opening of the emergency vent valve 147 during the emergency functioning of the apparatus. For this purpose the adapter member 45 is provided with a recess which is located opposite the piston member 61 and defined by an annular wall or shoulder 326. When the emergency piston 34 moves to its emergency position, the piston member 61 enters the recess and cooperates with the adapted member 45 in defining a closed auxiliary chamber 327. The rim of the piston member 61 is of substantially the same size and shape as the recess and its peripheral edge cooperates with the shoulder 326 in forming a seal, or partial seal, at this point. The formation of the closed auxiliary chamber 327 excludes the pressure of the brake pipe chamber 57 from a substantial portion of the area of the emergency piston 34 so that the pressure in the compartment 59 will be more effective in rapidly moving the emergency piston to its emergency position.

To prevent pressure fluid from being trapped in the auxiliary chamber 327, the adapter 45 is provided with an escape passage 328 which connects this chamber with the vent chamber 110. The escape passage 328 is controlled by a valve 329 which is normally held in engagement with a seat 330 by a spring 331. The valve 329 has a stem 329a which extends into the auxiliary chamber 327 and is adapted to be engaged by the piston member 61 so that movement of the emergency piston 34 toward its emergency position will automatically open this valve. The escape passage 328 also permits the free escape of pressure fluid which is vented into the auxiliary chamber 327 through the passage 135 of the emergency piston from the compartment 59 and the control chamber 40. The venting of the auxiliary chamber 327 by the opening of the valve 329 thus permits a more rapid movement of the piston 34 to its emergency position by the pressure of the fluid in the control chamber 40.

Fig. 15 of the drawings shows another modified construction for the control valve mechanism 14 in which the pressure fluid from the auxiliary reservoir 31 is delivered into the application chamber 32 through the compartment 179a of the relay valve mechanism 35. For this purpose the adapter member 177 is provided with a passage 332 which connects the compartment 179a with the application chamber directly instead of through the valve chamber 182. The passage 332 is restricted as by means of a choke member 333 having an orifice or restricted passage 334 therein.

When pressure fluid is supplied to the relay valve mechanism 35 from the auxiliary reservoir 31 during an application of the brake, it is delivered to the compartment 179a through the passage 99, the valve chamber 182, and the passage 217. Because of the restriction 334 this pressure fluid acts first on the piston 184 before being supplied to the application chamber 32 and, hence, the relay valve mechanism will be actuated very quickly and without incurring the delay which would result if the application chamber had to be charged with pressure fluid before the actuation of the relay valve mechanism could be produced. With the arrangement just described the compartment 179a of the relay valve mechanism 35 can be vented to atmosphere to facilitate the release of the brake, by manually opening the valve 225 through the actuating lever 228 but since the application chamber 32 is connected with the compartment 179a by the passage 332, it will also be vented. Pressure from the auxiliary reservoir will be supplied to compartment 182a and will hold valve 176 closed. This eliminates the need for the trainman to hold the valve 225 open.

Conclusion

From the foregoing description and the accompanying drawings it will now be readily understood that this invention provides an improved air brake apparatus which is of a relatively simple and practical construction which can be very readily serviced, and in which novel venting means is provided which is effective on the relay valve means for causing the release of brake cylinder pressure substantially without loss of reservoir pressure. Additionally, it will be seen that by relieving the emergency piston of a substantial portion of the pressure of the brake pipe, the emergency piston will be rendered more effective for insuring a desired opening of the emergency vent valve.

Having thus described my invention, I claim:

1. In an air brake control valve mechanism; a housing containing an application chamber and also having passages therein adapted for connection with a brake pipe, a brake cylinder, a supply reservoir, said application chamber and the atmosphere; valve means in said housing operable to cause pressure variations in said application chamber in accordance with desired service or emergency applications of the brake; relay valve means including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency applications and for exhausting fluid from the brake cylinder; and manually operable valve means for venting said piston chamber to atmosphere for causing the release of brake cylinder pressure by said relay valve means.

2. In an air brake control valve mechanism; a housing containing an application chamber and also having passage means therein adapted for connection with a brake pipe, a brake cylinder, a supply reservoir, an auxiliary reservoir, said application chamber and the atmosphere; piston means responsive to pressure differentials between said brake pipe and auxiliary reservoir; valve means controlling the passage means for said application chamber and adapted to be actuated by said piston means for supplying pressure fluid to the application chamber and exhausting fluid therefrom to atmosphere; relay valve means controlling the passage means for said brake cylinder including a piston chamber having a relay valve actuating piston therein and said piston chamber being connected with said application chamber such that said relay valve means is responsive to pressure variations in said application chamber for supplying pressure fluid to the brake cylinder from said supply reservoir and exhausting fluid from said brake cylinder; and manually operable valve means for venting said piston chamber to atmosphere for causing the release of brake cylinder pressure by said relay valve means substantially without loss of pressure fluid from said supply reservoir or said auxiliary reservoir.

3. In an air brake control valve mechanism; a housing containing an application chamber and also having passage means therein adapted for connection with a brake pipe, a brake cylinder, a supply reservoir, an auxiliary reservoir, said application chamber and the atmosphere; piston means responsive to emergency brake pipe pressure reductions; valve means controlling the passage means for said application chamber and adapted to be actuated by said piston means for supplying pressure fluid to the application chamber and exhausting fluid therefrom; relay valve means controlling the passage means for said brake cylinder including a piston chamber having a relay valve actuating piston therein and said piston chamber being connected with said application chamber such that said relay valve means is responsive to pressure variations in said application chamber for supplying pressure fluid to the brake cylinder from said supply reservoir and exhausting fluid from said brake cylinder; means for supplying pressure fluid from said supply reservoir to said application chamber in response to an emergency brake pipe pressure reduction; and manually operable valve means for venting said piston chamber for causing fluid to be exhausted from said brake cylinder by said relay valve means following said emergency reduction and substantially without loss of pressure fluid from said supply reservoir.

4. In an air brake control valve mechanism; a housing containing an application chamber and also having passages therein adapted for connection with a brake pipe, a brake cylinder, a supply reservoir, an auxiliary reservoir, said application chamber and atmosphere; service piston means operable in said housing in response to a service brake pipe pressure reduction; valve means adapted to be actuated by said service piston means for supplying pressure fluid to said application chamber from said auxiliary reservoir and venting pressure fluid from said application chamber to atmosphere; relay valve means including a piston chamber having a relay valve actuating piston therein and said piston chamber being connected with said application chamber such that said relay valve means is responsive to pressure variations in said application chamber for supplying pressure fluid to said brake cylinder from said supply reservoir and exhausting fluid from said brake cylinder; emergency piston means operable in said housing in response to an emergency brake pipe pressure reduction; valve means operable to supply pressure fluid to said application chamber from said supply reservoir for causing an emergency application of the brake in response to said emergency reduction; a second vent means for venting said piston chamber to atmosphere; and manual means for actuating said second vent means for causing the release of brake cylinder pressure by said relay valve means substantially without loss of pressure fluid from said supply reservoir.

5. In an air brake control valve mechanism; a housing containing an application chamber and also having passages therein adapted for connection with a brake cylinder, a supply reservoir, said application chamber and atmosphere; valve means operable to cause pressure variations in said application chamber in accordance with desired service or emergency applications of the brake; relay valve means including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency applications and for exhausting fluid from the brake cylinder; a vent valve for venting said piston chamber to atmosphere; a vent valve for venting said supply reservoir to atmosphere; and manually operable means for actuating said vent valves in succession.

6. In an air brake control valve mechanism; a housing containing an application chamber and also having passages therein adapted for connection with a brake cylinder, a supply reservoir, said application chamber and atmosphere; valve means operable to cause pressure variations in said application chamber in accordance with desired service or emergency applications of the brake; relay valve means including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency applications and for exhausting fluid from the brake cylinder; a vent valve for venting said piston chamber to atmosphere; a vent valve for venting said supply reservoir to atmosphere; and manually operable actuating means movable to one position for opening the piston chamber vent valve and to a second position for opening the supply reservoir vent valve.

7. In an air brake control valve mechanism; a housing containing an application chamber and also having passages therein adapted for connection with a brake pipe, a brake cylinder, a supply reservoir, an auxiliary reservoir and said application chamber; valve means in said housing and operable to cause pressure variations in said application chamber in accordance with desired service or emergency applications of the brake; relay valve means in said housing including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency application and for exhausting fluid from the brake cylinder; said housing also having therein vent connections to atmosphere from said piston chamber and said supply reservoir and vent valves controlling said vent connections; and manually operable actuating means extending into said housing for causing a sequential actuation of said vent valves including a substantially axially movable rod for direct cooperation with one of said vent valves and lever means adapted to transmit motion to the other of said vent valves.

8. An air brake control valve mechanism comprising; a housing having therein a brake pipe connection, an emergency release control chamber, and an emergency piston chamber; an emergency piston in said piston chamber comprising a flexible diaphragm dividing said piston chamber into two compartments and a substantially circular rigid piston body portion connected with said diaphragm; one of said compartments being normally in communication with said brake pipe connection and the other being normally in communication with said release control chamber; said piston being operable in said piston chamber in response to a release control differential between said pressure chamber and said brake pipe connection; and hollow means in said housing including a substantially circular internal side wall and into which hollow means said piston body portion is movable by said pressure differential actuation of said piston with said piston body portion in cooperating relation to and surrounded by said side wall for defining with said hollow means a vented chamber for reducing the piston area subjected to brake pipe pressure.

9. An air brake control valve mechanism comprising; a housing having therein a brake pipe connection, an emergency release control chamber, an emergency piston chamber and an atmosphere connection; an emergency piston in said piston chamber comprising a flexible diaphragm dividing said piston chamber into two compartments and a substantially circular rigid piston body portion connected with said diaphragm; one of said compartments being normally in communication with said brake pipe connection and the other being normally in communication with said release control chamber; said piston being operable in said piston chamber in response to an emergency release control differential between said pressure chamber and said brake pipe connection; an emergency vent valve adapted to be opened by the emergency pressure differential actuation of said piston for venting said brake pipe connection to said atmosphere connection; and hollow means in said housing including a substantially circular internal side wall and into which hollow means said piston body portion is movable by said pressure differential actuation of said piston with said piston body portion in cooperating relation to and surrounded by said side wall for defining with said hollow means a vented chamber for reducing the piston area subjected to brake pipe pressure; said piston body portion having a check valve controlled passage extending therethrough for discharging pressure fluid from said release control chamber into said vented chamber.

10. An air brake control valve mechanism comprising; a housing having therein a brake pipe connection, a normally charged emergency release control chamber, an emergency piston chamber and an atmosphere connection; an emergency piston in said piston chamber comprising a flexible diaphragm dividing said piston chamber into two compartments and a substantially circular rigid piston body portion connected with said diaphragm; one of said compartments being normally in communication with said brake pipe connection and the other being normally in communication with said release control chamber; said piston being operable in said piston chamber in response to an emergency pressure differential between said release control chamber and said brake pipe connection; an emergency vent valve adapted to be opened by the emergency pressure differential actuation of said piston for venting said brake pipe connection to said atmosphere connection; hollow means in said housing including a substantially circular internal side wall and into which hollow means said piston body portion is movable by said pressure differential actuation of said piston with said piston body portion in cooperating relation to and surrounded by said side wall for defining with said hollow means a vent chamber for reducing the piston area subjected to brake pipe pressure; said piston body portion having a check valve controlled passage extending therethrough for discharging pressure fluid from said release control chamber into said vent chamber; and a normally closed vent valve adapted to be engaged and opened by said piston body portion for connecting said vent chamber with said atmosphere connection.

11. Air brake control valve mechanism as defined in claim 1 in which said manually operable valve means is also effective in venting said application chamber to atmosphere.

12. In an air brake control valve mechanism; a housing containing an application chamber and also having passages therein adapted for connection with a brake pipe, a brake cylinder, a supply reservoir, an auxiliary reservoir and said application chamber; valve means in said housing and operable to cause pressure variations in said application chamber in accordance with desired service or emergency applications of the brake; relay valve means in said housing including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency application and for exhausting fluid from the brake cylinder; said housing also having vent chamber means therein in communication with said piston chamber and said application chamber; a pair of valves associated with said vent chamber means, one being a normally closed valve adapted to be opened for venting said piston chamber to atmosphere for causing said relay valve means to release the brake cylinder pressure, and the other being a normally open valve adapted to be closed for preventing loss of pressure fluid from said application chamber and from said auxiliary reservoir; and manual means operable to cause opening of said normally closed valve and closing of said normally open valve.

13. In an air brake control valve mechanism; a housing containing an application chamber and also having passages therein adapted for connection with a brake pipe, a brake cylinder, a supply reservoir, an auxiliary reservoir and said application chamber; valve means in said housing and operable to cause pressure variations in said application chamber in accordance with desired service or emergency applications of the brake; relay valve means in said housing including a piston chamber having a relay valve actuating piston therein and said piston chamber being connected with said application chamber such that said relay valve means is responsive to the pressure variations in said application chamber for supplying pressure fluid to said brake cylinder from said supply reservoir for producing such service or emergency application and for exhausting fluid from the brake cylinder; said housing also having a vent chamber therein through which said auxiliary reservoir and said piston chamber are connected with said application chamber; a valve seat in said vent chamber between the connections of said auxiliary reservoir and piston chamber therewith; said vent chamber having an atmosphere connection on same side of said valve seat as the connection with said piston chamber, and the connection with said application chamber being on the same side of said valve seat as the connection with said auxiliary reservoir; a normally open valve adjacent said valve seat; a normally closed valve controlling said atmosphere connection; and manual actuating means operable to cause closing of said normally open valve and opening of said normally closed valve.

References Cited in the file of this patent

UNITED STATES PATENTS

| Number | Name | Date |
|---|---|---|
| 481,135 | Boyden | Aug. 16, 1892 |
| 836,886 | Mann | Nov. 27, 1906 |
| 886,409 | Richards | May 5, 1908 |
| 907,199 | Turner | Dec. 22, 1908 |
| 1,083,891 | Lipkowski | Jan. 6, 1914 |
| 1,286,843 | Turner | Dec. 3, 1918 |
| 1,464,640 | Breck et al. | Aug. 14, 1923 |
| 1,720,268 | Farmer | July 9, 1929 |
| 1,824,044 | Farmer | Sept. 22, 1931 |
| 1,935,808 | McCune | Nov. 21, 1933 |
| 1,938,738 | Campbell | Dec. 12, 1933 |
| 1,952,386 | Neveu | Mar. 27, 1934 |
| 1,980,504 | Seifferle | Nov. 13, 1934 |
| 2,016,409 | Fitch | Oct. 8, 1935 |
| 2,018,202 | Eaton et al. | Oct. 22, 1935 |
| 2,034,296 | Hewitt | Mar. 17, 1936 |
| 2,035,045 | Cook | Mar. 24, 1936 |
| 2,035,056 | Farmer | Mar. 24, 1936 |
| 2,088,066 | Livingston | July 27, 1937 |
| 2,094,173 | Jack | Sept. 28, 1937 |
| 2,106,491 | Sexton | Jan. 25, 1938 |
| 2,147,295 | Hewitt | Feb. 14, 1939 |
| 2,152,257 | Hewitt et al. | Mar. 28, 1939 |
| 2,178,927 | Campbell | Nov. 7, 1939 |
| 2,256,404 | McNeal | Sept. 16, 1941 |
| 2,302,377 | Pickert | Nov. 17, 1942 |